United States Patent
Iwanami et al.

(10) Patent No.: US 7,285,158 B2
(45) Date of Patent: Oct. 23, 2007

(54) RECORDING AGENT, IMAGE FORMING DEVICE, AND IMAGE FORMING METHOD

(75) Inventors: Takuya Iwanami, Chiba (JP); Haruo Yamamoto, Osaka (JP); Satoshi Nishigaki, Nara (JP); Tohru Sakuwa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 212 days.

(21) Appl. No.: 10/808,335

(22) Filed: Mar. 25, 2004

(65) Prior Publication Data

US 2004/0187737 A1 Sep. 30, 2004

(30) Foreign Application Priority Data

Mar. 27, 2003 (JP) .............................. 2003-089283

(51) Int. Cl.
*C09D 11/02* (2006.01)
(52) U.S. Cl. ................................ 106/31.32; 106/31.64
(58) Field of Classification Search ............. 106/31.32, 106/31.64
See application file for complete search history.

(56) References Cited

U.S. PATENT DOCUMENTS

| | | | | |
|---|---|---|---|---|
| 4,725,316 A | * | 2/1988 | Mahany, II | ................. 106/420 |
| 4,818,285 A | * | 4/1989 | Causley et al. | .......... 106/31.43 |
| 5,084,205 A | * | 1/1992 | Auslander | ............... 252/301.16 |
| 5,507,864 A | * | 4/1996 | Jaeger et al. | ............ 106/31.32 |
| 6,168,892 B1 | | 1/2001 | Ohara et al. | |
| 6,786,954 B1 | * | 9/2004 | Lee et al. | ................. 106/31.13 |
| 6,793,723 B2 | * | 9/2004 | Auslander et al. | ........ 106/31.32 |
| 6,827,769 B2 | * | 12/2004 | Auslander et al. | ........ 106/31.32 |
| 6,835,239 B2 | * | 12/2004 | Hakamada et al. | ........ 106/31.32 |
| 2004/0058458 A1 | * | 3/2004 | Anker et al. | ................. 436/526 |

FOREIGN PATENT DOCUMENTS

| JP | 2000-181170 | 6/2000 |
|---|---|---|
| WO | WO 03/038001 A1 * | 8/2002 |

* cited by examiner

*Primary Examiner*—J. A. Lorengo
*Assistant Examiner*—Veronica Faison-Gee
(74) *Attorney, Agent, or Firm*—Birch, Stewart, Kolasch & Birch, LLP

(57) ABSTRACT

An image forming method, device and a recording agent for forming an image through subtractive color mixing by using ink of plural color components different in hue. The ink is created by mixing a first coloring agent expressing one of the color components and a second coloring agent identical in hue to the first coloring agent. The ink has a higher spectral reflectance than a spectral reflectance of the first coloring agent.

6 Claims, 13 Drawing Sheets

SPECTRAL REFLECTANCE WHEN A FLUORESCENT COLORING LIQUID AND A NON-FLUORESCENT COLORING LIQUID ARE MIXED (MIXED M INK)

MAGENTA (NON-FLUORESCENT COLORING LIQUID)

YELLOW (NON-FLUORESCENT COLORING LIQUID)

MAGENTA (FLUORESCENT COLORING LIQUID)

YELLOW (FLUORESCENT COLORING LIQUID)

SPECTRAL REFLECTANCE WHEN A FLUORESCENT
COLORING LIQUID AND A NON-FLUORESCENT
COLORING LIQUID ARE MIXED (MIXED M INK)

SPECTRAL REFLECTANCE WHEN A FLUORESCENT
COLORING LIQUID AND A NON-FLUORESCENT
COLORING LIQUID ARE MIXED (MIXED Y INK)

MIXED M INK

MIXED Y INK

MAGENTA

YELLOW

RECORDING AGENT, IMAGE FORMING DEVICE, AND IMAGE FORMING METHOD

This Nonprovisional application claims priority under U.S.C. §119(a) on Patent Application No. 2003/089283 filed in Japan on Mar. 27, 2003, the entire contents of which are hereby incorporated by reference.

FIELD OF THE INVENTION

The present invention relates to a recording agent, an image forming device and an image forming method which are used for reproduction of images with a photocopier or a printer.

BACKGROUND OF THE INVENTION

Generally, an image recorded on a paper for example, through subtractive color mixing has a narrower color reproduction range than a displayed image that is outputted through additive color mixing. With this fact, in the technical field adopting the subtractive color mixing for outputting an image as a result of image processing, there have been inquisitions for various color materials or researches of usage of fluorescent materials so as to enlarge color reproduction range and to improve hue.

One example of such researches for realizing enlargement of color reproduction range and improvement of hue can be found in a color image forming method disclosed in Japanese Laid-Open Patent Application Tokukai 2000-181170 (published on Jun. 30, 2000). According to this image forming method of the Document 1, colors are compensated during formation of a hard copy through subtractive color mixing by adding a fluorescent material to ink (color material) of a color component so as to enlarge color reproduction range and/or improve hue. With this method, the Document 1 obtains a color reproduction range almost as wide as that of an image outputted through a CRT (Cathode-Ray Tube) even for a hard copy reproduced based on the subtractive color mixing.

More specifically, the method of the Japanese Laid-Open Patent Application Tokukai 2000-181170 (hereinafter referred to as a Document 1) carries out additive color mixing with respect to ink of a coloring component used for a color image forming method, by adding a fluorescent material having a luminescence characteristic to the ink. This results in cancellation of sub-absorbency, which is a characteristic of the ink of a coloring component. Namely, the Document 1 realizes enlargement of color reproduction range by carrying out subtractive color mixing with ink of a color component which additionally includes a fluorescent material.

Further, as described in the foregoing publication Tokukai 2000-181170 in Paragraph 0011, the color compensation in the foregoing case refers to generation of change in at least one of absorbency of color, absorption waveform, half value breadth, absorption peak, color purity, brightness and saturation. Accordingly, the foregoing color compensation is performed by changing absorbency etc. of color in the ink of a color component.

Further, According to the Document 1, the fluorescent material is added to the ink of a color component in an amount or in a ratio for offering −0.3 or greater absorbency throughout the whole wavelength. Note that, in the embodiments described in the Document 1, the compounding ratio of the fluorescent material added to the ink of a color component is specified at or lower than 5%. The document 1 states that this ratio is determined in consideration of suppression of fluorescence generated in the ink of a color component, so as to get rid of other effects than color compensation.

However, image output induces no degradation of picture quality in some cases even with the fluorescence generated by addition of a fluorescent material into the ink of a color component, since the brightness of fluorescent ink is enhanced and results in superior picture quality. Further, there are some difficulties in practice to cancel the sub-absorption of the ink of a color component only by the addition of a fluorescent material in a ratio of as small as around 5% to the ink of a color component. Besides, the addition of this amount causes few changes in hue, brightness or saturation of the ink. As a result, neither color compensation nor enlargement of color reproduction range can be achieved.

SUMMARY OF THE INVENTION

The present invention is made in view of the foregoing conventional problems, and an object is to provide a recording agent (ink) of a color component used for color reproduction through subtractive color mixing and capable of realizing enlargement of color reproduction range of images reproduced. The present invention also provides an image forming device and an image forming method using the recording agent.

In order to solve the foregoing problems, a recording agent according to the present invention is a recording agent of a color component used for color reproduction through subtractive color mixing, the recording agent mainly containing a first coloring agent expressing the color component and a second coloring agent identical in hue to the first coloring agent, the recording agent having a higher spectral reflectance than a spectral reflectance of the first coloring agent.

With this arrangement, the recording agent mainly contains a first coloring agent expressing one of the color components for subtractive color mixing and a second coloring agent identical in hue to the first coloring agent. Further, this recording agent has a higher spectral reflectance than the first coloring agent. Therefore, the recording agent is the same in hue range as the first coloring agent, but higher in brightness and/or saturation than the first coloring agent. In other words, the recording agent mainly containing the first and second coloring agents has the same hue range as that of the first coloring agent, but performs reproduction with colors of high brightness and/or saturation, which cannot be achieved by a recording liquid made only of the first coloring agent.

On this account, by using the foregoing coloring agent as a color component for subtractive color mixing, it is possible to reproduce color higher in brightness and/or saturation, which cannot be achieved by composition of first coloring liquid and another coloring liquid having different hue, thus enlarging color reproduction range.

Note that, the recording agent refers to such as ink, toner, liquid dye, paint or liquid in which pigment is dispersed, which are used for forming an image on a recording medium. Further, the hue refers to types of color (colors identified as red, yellow, or blue) differentiated by a predetermined hue angle range in a chromatography, or a value found by chroma $a^*$ and $b^*$ in a $L^*a^*b^*$ color system. Further, the hue angle refers to an angle created by a direction denoting a color and a direction denoting a base color in a Munsell hue circle, a chromatography or a L*a*b* color system.

In order to solve the foregoing problems, an image forming device according to the present invention includes recording agents of plural color components different in hue so as to form an image on a recording medium through subtractive color mixing, the image forming device including a plurality of head sections with a plurality of discharging sections for individually discharging on the recording medium a first coloring agent expressing one of the color components and a second coloring agent identical in hue as the first coloring agent so as to mix the first coloring agent and the second coloring agent on the recording medium in order to generate a color component having a spectral reflectance higher than a spectral reflectance of the first coloring agent.

With this arrangement, the image forming device includes a plurality of head sections with a plurality of discharging sections for individually discharging the first coloring agent of one of the color components for subtractive color mixing, and the second coloring agent in the same hue. With this function, the first coloring agent and the second coloring agent may be applied onto the same or adjacent portions of the recording medium. Thus, it is possible to mix the first coloring agent and the second coloring agent in the same hue on the recording medium, thus creating a color component identical in hue to the first coloring agent.

Note that, in an image forming device using a recording agent created by previously mixing the first coloring agent and the second coloring agent in the same hue in a specific compounding ratio, the colors to be expressed are automatically determined. On the other hand, the image forming device of the present invention applies the first coloring agent and the second coloring agent from the head sections and then mix the two coloring agents on a recording medium. With this structure, the two coloring agents can be mixed in an arbitrary compounding ratio, thus achieving a wider color reproduction.

Thus, by carrying out color reproduction through subtractive color mixing with this image forming device, it is possible to reproduce colors higher in brightness and/or saturation, which cannot be achieved by the first coloring agent, thus enlarging color reproduction range. Further, since the first and second coloring agents are mixed at an arbitrary ratio, it is possible to obtain a wider color reproduction range than the recording agent containing the first coloring agent and the second coloring agent at a specific ratio.

In order to solve the foregoing problems, an image forming method according to the present invention is a method for forming an image with recording agents of plural color components different in hue, each of the recording agents being created by a first coloring agent expressing one of the color components and a second coloring agent identical in hue to the first coloring agent, the recording agent having a color component with a higher spectral reflectance than a spectral reflectance of the first coloring agent.

With this arrangement, the recording agent is created by mixing the first coloring agent expressing one of the color components for subtractive color mixing, and the second coloring agent identical in hue to the first coloring agent. Further, this recording agent has a higher spectral reflectance than that of the first coloring agent. On this account, by using the recording agent as the color component for subtractive color mixing, it is possible to reproduce color higher in brightness and saturation than the use of the first coloring agent, thus enlarging color reproduction range.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 9($a$) shows hue angle for each compounding ratio, ($b$) shows saturation for each compounding ratio, and FIG. 9($c$) shows brightness for each compounding ratio.

FIG. 10($a$) shows hue angle for each compounding ratio, FIG. 10($b$) shows saturation for each compounding ratio, and FIG. 10($c$) shows brightness for each compounding ratio.

DESCRIPTION OF THE EMBODIMENTS

First Embodiment

The present invention relates to a recording agent having color components for reproducing colors according to a subtractive color mixing. The recording agent having color components can be created by mixing a non-fluorescent coloring liquid as a first coloring agent for the color components, and a fluorescent coloring liquid as a second coloring agent which has the same hue as that of the first coloring agent.

Here, the recording agent refers to such as ink, toner, liquid dye, paint or liquid in which pigment is dispersed, which are used for forming an image on a recording medium. Further, the hue in the present embodiment refers to types of color differentiated by a predetermined hue angle range in a chromatography, or a value found by chroma a* and b* in a color system. Further, the hue angle refers to an angle created by a direction denoting a color and a direction denoting a base color in a Munsell hue circle, a chromatography or a L*a*b* color system. Furthermore, a recording medium in the present embodiment refers to such as a recording paper used for recording/reproducing an image with an image output device such as a printer, photocopier or the like.

Figure 13:
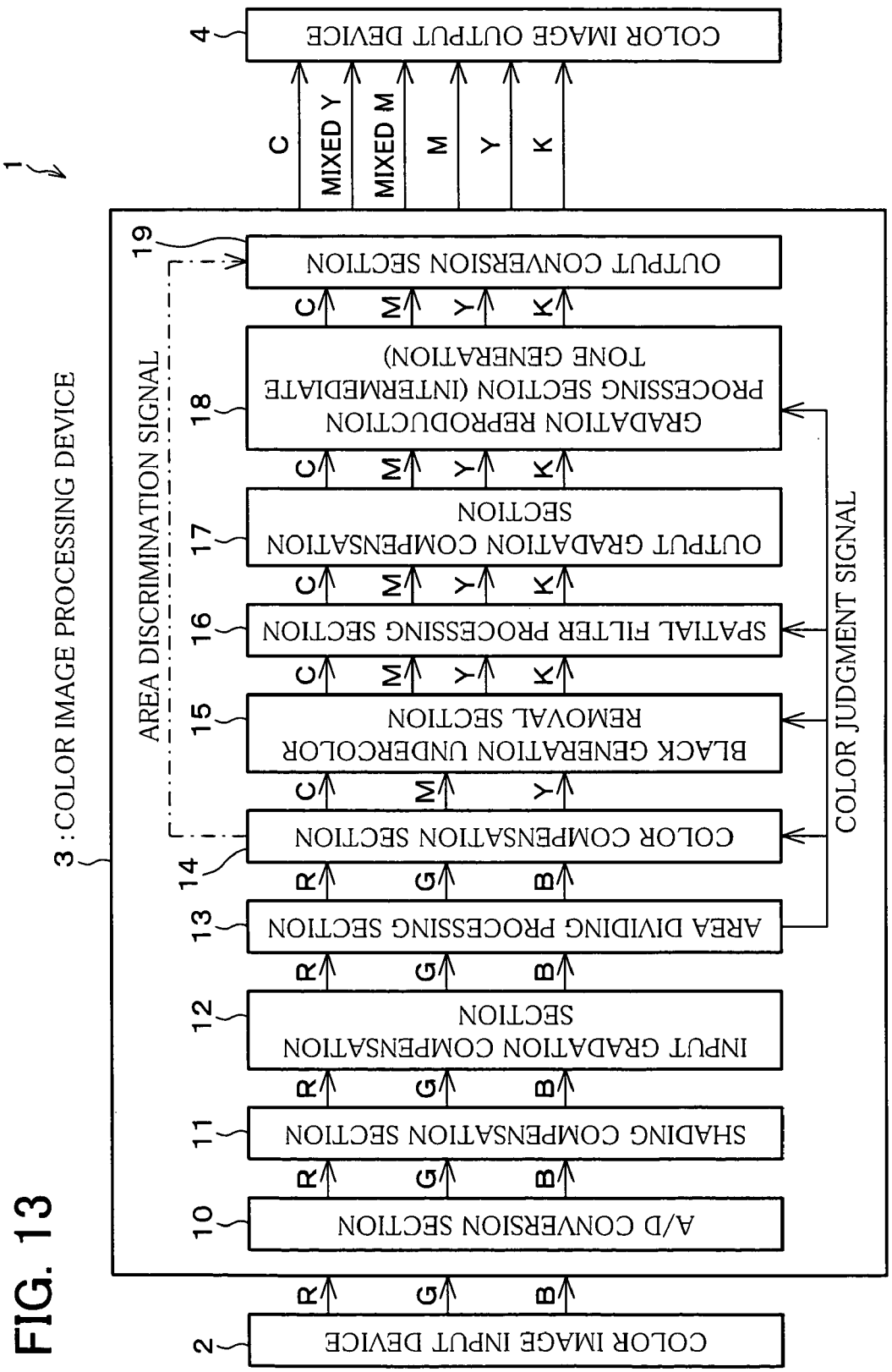
FIG. 13 is a block diagram showing an arrangement of a digital color photocopier according to the embodiment.

One embodiment of the present invention will be described below with reference to Figures. Firstly, the following describes a schematic structure of a digital color photocopier, which is used for enforcing an image forming method of the present embodiment. The digital color photocopier functions as a photocopier and also as a multi-functional device. FIG. 13 shows one example of the structure of the digital color photocopier. The digital color photocopier 1 in this example includes a color image input device 2, a color image processing device 3, and a color image output device 4. With this structure, this digital color photocopier 1 carries out image forming by inputting an image through the color image input device 2, processing the inputted image through the color image processing device 3, and printing the processed image through the image output device 4.

The color image input device 2 (hereinafter referred to as an image input device 2) is made up of a scanner section including a CCD (Charge Coupled Device), which reads a reflected image of a document as an analog signal having R (Red), G (Green) and B (Blue) components, and outputs the analog signal to the color image processing device 3.

As shown in FIG. 13, the color image processing device 3 (hereinafter referred to as an image processing device 3) includes an A/D conversion section 10, a shading compensation section 11, an input gradation compensation section 12, an area dividing processing section 13, a color compensation section 14, a black generation undercolor removal section 15, a spatial filter processing section 16, an output gradation compensation section 17, a gradation reproduction processing section 18, and an output conversion section 19. The image processing device 3 is connected to the image input device 2 and the image output device 4 to constitute the digital color photocopier 1.

The analog signal read by the image input device 2 is converted into digital image data by the A/D conversion section 10. The digital image data is sent to the shading compensation section 11, the input gradation compensation section 12, the area dividing processing section 13, the color compensation section 14, the black generation undercolor removal section 15, the spatial filter processing section 16, the output gradation compensation section 17, the gradation reproduction processing section 18, and the output conversion section 19 in this order; and is outputted to the color image output device 4 as digital image data having C (Cyan), M (Magenta), Y (Yellow), and K (Black) components. The structure of the image processing device 3 will be more specifically described later.

The color image output device 4 (hereinafter referred to as an image output device 4) is an inkjet printer for outputting a color image on a paper as a recording medium based on the digital image data having C, M, Y and k components which is sent from the image processing device 3. The structure of the image output device 4 will be more specifically described later.

The A/D (Analog to Digital) conversion section 10 is a block for carrying out sampling and quantization with respect to the analog signal of R, G and B so as to generate a digital image data, which is then outputted to the shading compensation section 11.

The shading compensation section 11 is a block for carrying out shading compensation so as to remove various deformations, which is occurred in a illumination system, in an image forming section, and in a filming section of the image input device 2, from the digital image data of R, G and B sent from the A/D conversion section 10. Then, the digital image data of R, G and B having been through the shading compensation is outputted to the input gradation compensation section 12.

The input gradation compensation section 12 carries out processing for adjusting color balance of the digital image data of R, G and B having been liberated from various deformation by the shading compensation section 11, and also converts the digital image data into a signal which can be easily compatible with an image processing system used in the color image processing device 3. This can be conversion from a reflectance signal into a deepness signal.

The area dividing processing section 13 is a block for identifying the respective pixels of the digital image data of R, G and B sent from the input gradation compensation section 12 so as to classify the pixels into one of a text area, a halftone area and a photograph area. Further, the area dividing processing section 13 sends an area identification signal, which denotes the areas to which the pixels belong, to the area dividing processing section 13, the black generation undercolor removal section 15, the spatial filter processing section 16, and the gradation reproduction processing section 18; and also, passes on the digital image data of R, G and B inputted from the input gradation compensation section 12 to the color compensation section 14 of the next stage without modification.

The color compensation section 14 is a block for converting a digital image data of R, G and B into a digital image data of C, M and Y; and also for carrying out color compensation by removing muddiness of colors due to disused absorption component included in C, M and Y color materials as their spatial characteristic. With this processing, precise color reproduction can be realized.

Alternatively, the color compensation section 14 may detect brightness or saturation of the digital image data of R, G and B so as to compare them with a predetermined default value, and then may output the result of comparison to the output conversion section 19 as a color judgment signal. Further, the output conversion section 19 may choose one of a non-fluorescent coloring agent, and a recording agent containing both a non-fluorescent coloring agent and a fluorescent coloring agent, based on the color judgment signal. Here, the following formula may be used for figuring out brightness, luminance or saturation, for example.

Luminance=0.30$R$+0.59$G$+0.11$B$

Saturation=max($R,G,B$)−min($R,G,B$)

Furthermore, the brightness and saturation may also be found by converting the digital image data R, G and B into image data of a L*a*b* color system. However, this operation is not necessarily has to be carried out by the color compensation section 14.

The black generation undercolor removal section 15 carries out black generation operation for extracting digital image data of black (K) component from the digital image data of C, M and Y sent from the color compensation section 14. The black generation undercolor removal section 15 also functions as a block for generating new digital image data of C, M and Y by subtracting the K data extracted through the black generation operation from the respective original digital image data of C, M and Y. Namely, the black generation undercolor removal section 15 converts the digital image data of C, M and Y (three colors) into a digital image data of C, M, Y and K (four colors).

One possible example of black generation operation is enforced by a method (general method) using skeleton black. This method is carried out according to the following formulas (1) through (4), $$K'=f\{\min(C,M,Y)\} \quad (1)$$

$$C'=C-\alpha K' \quad (2)$$

$$M'=M-\alpha K' \quad (3)$$

$$Y'=Y-\alpha K' \quad (4)$$

where y=f(x) denotes input/output characteristic of skeleton curve; C, M and Y denote the input data; C', M' and Y' denote the output data; and α demotes UCR ratio (Under Color Removal) satisfying 0<α<1.

The spatial filter processing section 16 is a block for carrying out spatial filter processing by using a digital filter with respect to the digital image data of C, M, Y and K sent from the black generation undercolor removal section 15 based on an area identification signal sent from the area dividing processing section 13. This process is performed to compensate spatial frequency characteristic of the digital image data of C, M, Y and K, so as to prevent blur or granular degradation of the output image.

For example, the spatial filter processing section 16 carries out sharpness enhancement operation with respect to the pixel identified as a text area by the area diving processing section 13 so that the high frequency data of the pixel is enhanced. As a result, reproduction, particularly for black text or color text, in the output image improves. Further, the spatial filter processing section 16 carries out low-pass filter processing with respect to the pixel identified as a halftone area by the area diving processing section 13 so as to remove halftone component from the input image.

The output gradation compensation section 17 is a block for carrying out output gradation compensation by converting deepness data etc. extracted from the digital image data of C, M, Y and K into, for example, a halftone area ratio, which is a characteristic value of an inkjet recording device.

The gradation reproduction processing section 18 is a block for carrying out gradation reproduction operation (generation of intermediate tones) by dividing the digital image data of C, M, Y and K sent from the output gradation compensation section 17 into pixels so as to eventually reproduce the respective gradations. Further, the gradation reproduction processing section 18 is a block for carrying out digitalization or creating many-valued state with a high resolution screen suitable for broadband reproduction, based on the area identification signal sent from the area dividing processing section 13.

For example, with respect to the pixel identified as a photograph area by the area dividing processing section 13, the gradation reproduction processing section 18 carries out digitalization or creates many-valued state with a high resolution screen particularly suitable for gradation reproduction.

The output conversion section 19 chooses one of a non-fluorescent coloring agent (first coloring agent: non-fluorescent coloring agent), and a recording agent containing both a non-fluorescent coloring agent and a fluorescent coloring agent (second coloring agent: fluorescent coloring agent) based on the judgment result of the color compensation section 14, as described above.

More specifically, the output conversion section 19 carries out operation for converting the digital image data made of C, M, Y, K, mixed M and mixed Y into output image data which corresponds to alignment of the heads (inkjet heads for C, M, Y, K, mixed M and mixed Y etc.) of the image output device 4. Note that, the digital data image of the mixed M refers to a signal showing gradation of the area to be formed by the recording agent containing non-fluorescent coloring agent of M and fluorescent coloring agent of M. Further, the digital data image of the mixed M refers to a signal showing gradation of the area to be formed by the recording agent containing non-fluorescent coloring agent of Y and fluorescent coloring agent of Y. Further, the choice of recording agent according to the judgment result of the color compensation section 14 is not necessarily has to be carried out by the output conversion section 19, but may be performed by a different block provided at a previous stage of the output conversion section 19.

The digital image data of C, M, Y, K, mixed M and mixed Y having been through the foregoing processes is then temporarily stored in storing means before it is outputted to the image output device 4 by being read out at predetermined timings. Note that, this storing/reading out operation is performed by using a main memory device, such as a RAM (Random Access Memory), as a working area, and is controlled by CPU (Central Processing Unit). The RAM and the CPU are not shown in Figures.

Figure 1:
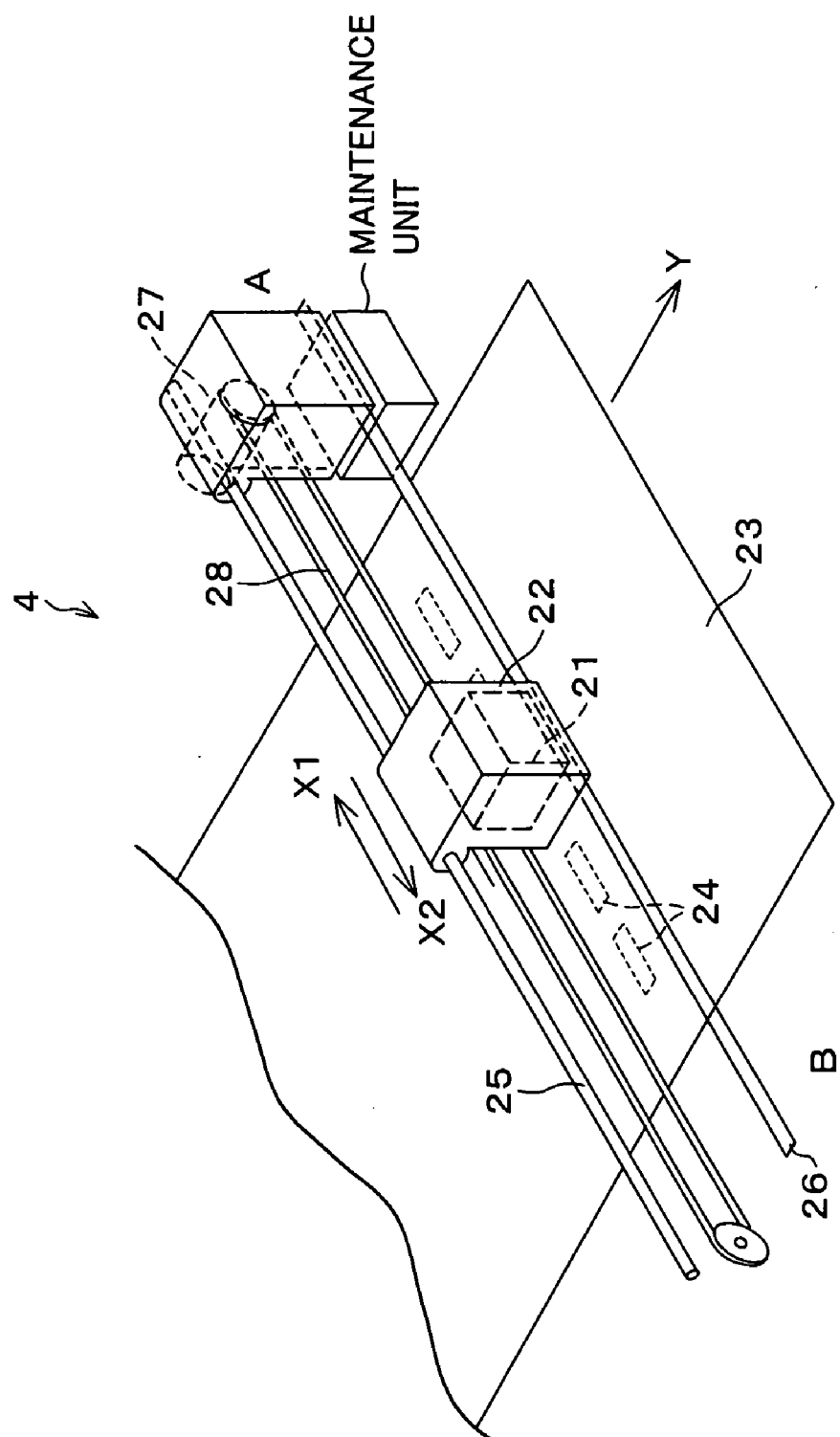
FIG. 1 is a perspective view illustrating an image output device according to one embodiment of the present invention.

Next, the following will explain the structure of the image output device 4 in detail. FIG. 1 is a perspective view illustrating the entire configuration of an inkjet recording device (photocopier, multi-functional printer device) which functions as the image output device 4.

The image output device 4 carries out printing by an inkjet method by discharging a recording agent onto a recording medium (such as a paper etc.) according to the digital image data of C, M, Y, K, mixed M and mixed Y sent from the image processing device 3.

As shown in FIG. 1, the image output device 4 includes a carriage 22 having a head (inkjet head) 21 and is movable on the recording medium 23 along the main scanning direction (direction of X1 or X2). The image output device 4 carries out printing by moving the carriage 22 in the direction X1 or X2. With this operation, the carriage 22 discharges ink to the recording medium 23. Meanwhile, the image output device 4 moves the recording medium 23 in the sub-scanning direction (Y direction in the figure) so as to carry out printing on the entire plane of the recording medium 23.

The recording medium 23 is placed in the paper feeding section (not shown), and is sent out one by one by a feeding roller (not shown). Then, the recording medium 23 is supplied by a carriage roller (recording medium carrying means; not shown) to a portion opposite to the head 21. The recording medium 23 having been through recording is then discharged to a discharge section (not shown).

The carriage 22 having the head 21 is held by a guide shaft 25 to be slidably placed on holding means 26 extending in the main scanning direction. The carriage 22 is therefore positioned to be opposite to the recording medium 23 at a predetermined position. The carriage 22 is hung in parallel with the guide shaft 25, and is moved by a driving belt 28 which is driven by the carriage roller (driving means) 24 controlled by a motor 27.

Figure 2:
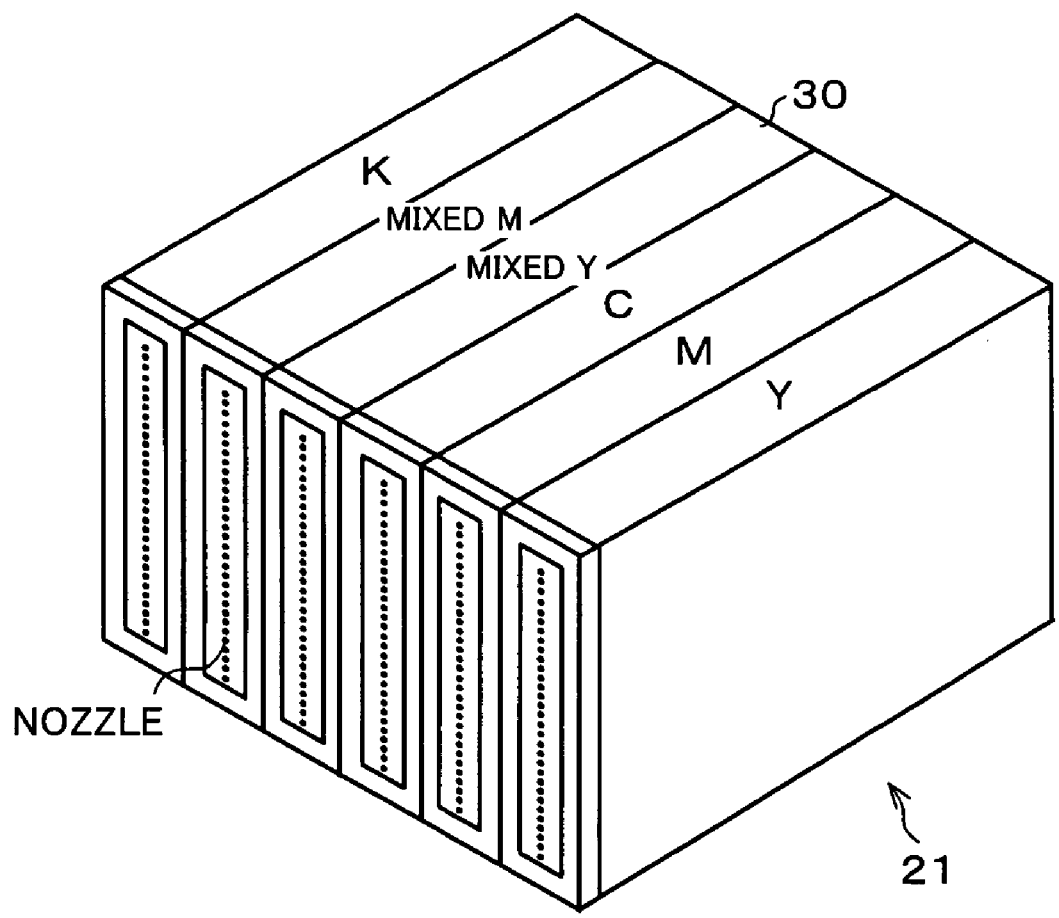
FIG. 2 is a perspective view illustrating a head provided in the image output device.

As shown in FIG. 2, the head 21 provided in the carriage 22 includes an ink tank 30 containing plural colors of inks for the respective color components, such as C, M, Y, K, mixed M and mixed Y. The plural colors of inks are discharged according to the digital image data sent from the output conversion section 19 so as to form an image on the recording medium 23. Here, a mixed M (magenta) ink refers to a recording agent obtained by mixing a non-fluorescent coloring agent of M and a fluorescent coloring agent of M; and a mixed Y (Yellow) ink refers to a recording agent obtained by mixing a non-fluorescent coloring agent of Y and a fluorescent coloring agent of Y.

Next, the following will explain a recording agent of color components according to the present embodiment, and an image forming method using the recording agent.

Note that, the recording agent of a color component according to the present embodiment refers to ink (mixed M ink, or mixed Y ink) obtained by mixing a non-fluorescent coloring agent and a fluorescent coloring agent of the same hue, or ink containing only a non-fluorescent coloring agent. Further, a non-fluorescent coloring agent refers to a coloring agent not containing a fluorescent component, and fluorescent coloring agent refers to a coloring agent containing only a fluorescent component.

Figure 3:
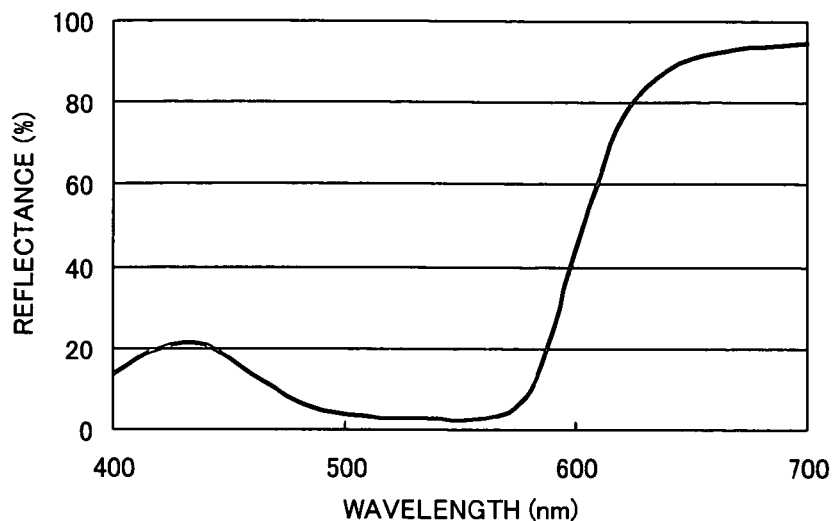
FIG. 3 is a drawing showing a reflectance spectrum of magenta non-fluorescent coloring liquid.
Figure 4:
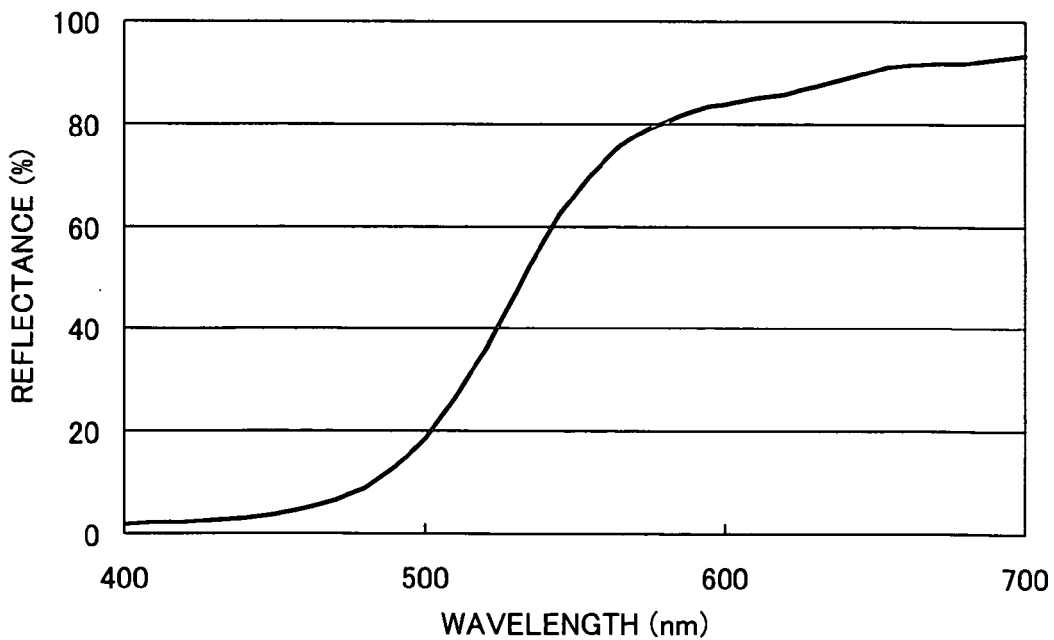
FIG. 4 is a drawing showing a reflectance spectrum of yellow non-fluorescent coloring liquid.

Here, FIG. 3 shows a measurement result of spectral reflectance of a non-fluorescent coloring agent used for mixed M ink; and FIG. 4 shows a measurement result of spectral reflectance of a non-fluorescent coloring agent used for mixed Y ink. In FIGS. 3 and 4, the horizontal axis denotes wavelength and the vertical axis denotes a spectral reflectance with respect to wavelength. Note that, the spectral reflectance is measured with a X-Rite 938 spectrophotometric colorimeter.

Figure 5:
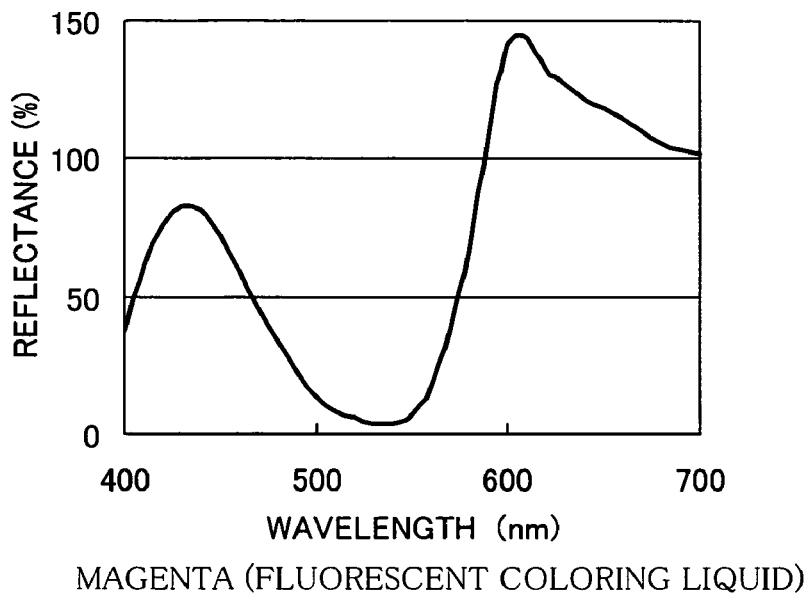
FIG. 5 is a drawing showing a reflectance spectrum of magenta non-fluorescent coloring liquid.
Figure 6:
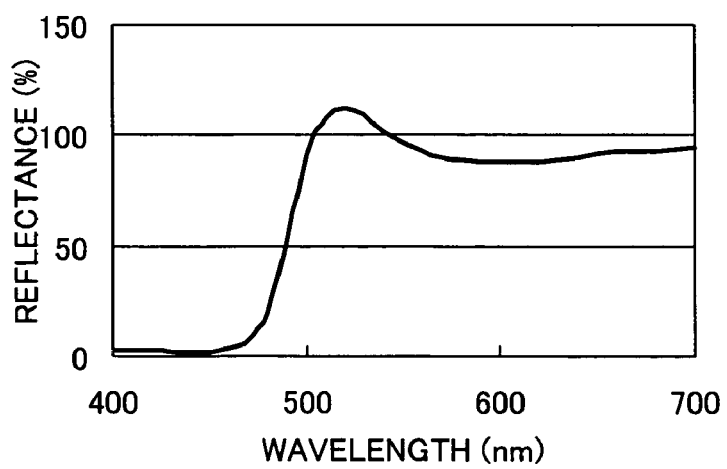
FIG. 6 is a drawing showing a reflectance spectrum of yellow non-fluorescent coloring liquid.

Meanwhile, FIG. 5 shows a measurement result of spectral reflectance of a fluorescent coloring agent used for mixed M ink. Further, FIG. 6 shows a measurement result of spectral reflectance of a fluorescent coloring agent used for mixed Y ink.

Referring to the spectral reflectance of a fluorescent coloring agent used for mixed M ink, which is shown in FIG. 5, has two peaks in the vicinity of the wavelength of 430 nm and in the vicinity of the wavelength of 610 nm. Further, referring to the spectral reflectance of a fluorescent coloring agent used for mixed Y ink, which is shown in FIG. 6, has a peak in the vicinity of the wavelength of 520 nm.

Figure 7:
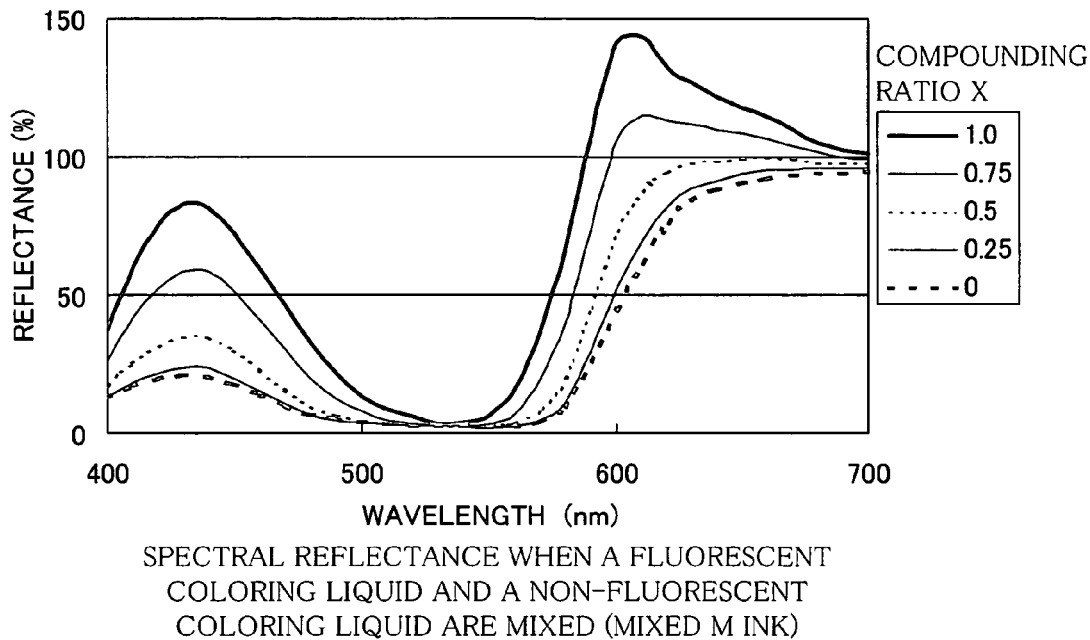
FIG. 7 is a drawing showing a reflectance spectrum of mixed magenta ink that is created by mixing yellow non-fluorescent coloring liquid and magenta non-fluorescent coloring liquid.
Figure 8:
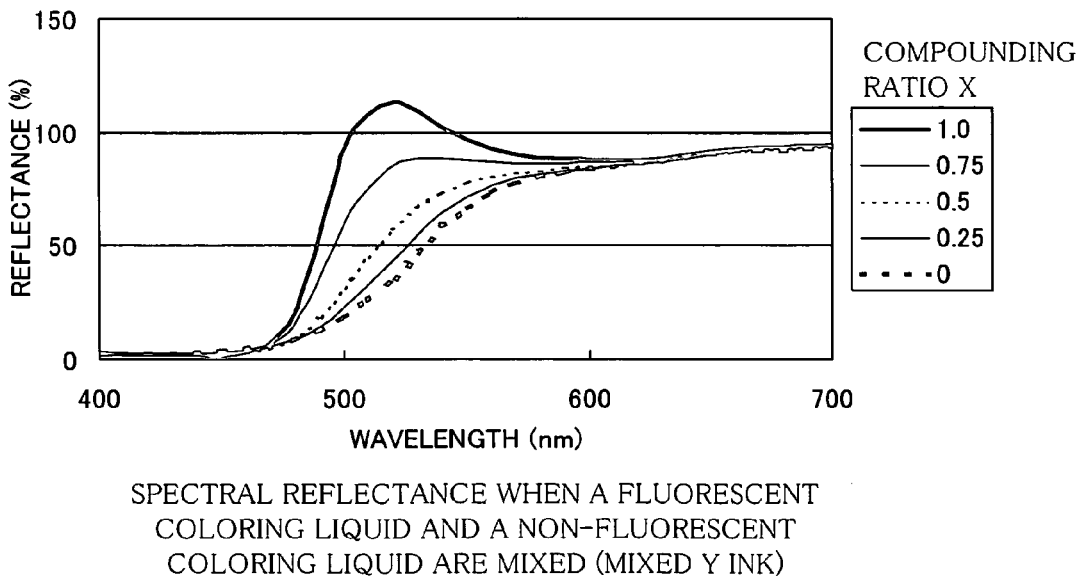
FIG. 8 is a drawing showing a reflectance spectrum of mixed yellow ink that is created by mixing yellow non-fluorescent coloring liquid and yellow fluorescent coloring liquid.

FIGS. 7 and 8 respectively show measurement results of spectral reflectance of coloring agents used for mixed M ink and mixed Y ink in the case of including a non-fluorescent coloring agent and a fluorescent coloring agent in a ratio of 0:100, 25:75, 50:50, 75:25, 100:0. FIG. 7 shows a result for the mixed M ink, and FIG. 8 shows a result for the mixed Y ink. Further, the ratio of a fluorescent coloring agent contained in the agent will be hereinafter expressed as x=0 to 1, instead of the ratio above.

More specifically, x=0 means that the recording agent contains a fluorescent coloring agent in a ratio of 0%, and contains a non-fluorescent coloring agent in a ratio of 100%. Further, x=0.25 means that the recording agent contains a fluorescent coloring agent in a ratio of 25%, and contains a non-fluorescent coloring agent in a ratio of 75%; x=0.75 means that the recording agent contains a fluorescent coloring agent in a ratio of 75%, and contains a non-fluorescent coloring agent in a ratio of 25%; and x=1 means that the recording agent contains a fluorescent coloring agent in a ratio of 100%, and contains a non-fluorescent coloring agent in a ratio of 0%.

As shown in FIG. 7 regarding the mixed M ink, the spectral reflectance increases with an increase of the ratio of a fluorescent coloring agent with respect to the whole amount of the agent. Further, when the ratio x exceeds 0.75, the spectral reflectance draws a peak in the wavelength area where the emission peak, which indicates fluorescent magenta, exists (particularly in the vicinity of 610 nm). As shown in FIG. 8 regarding the mixed Y ink, the spectral reflectance increases with an increase of the ratio of a fluorescent coloring agent with respect to the whole amount of the agent, as with the case of the mixed M ink. Thus, when the ratio x exceeds 0.75, the spectral reflectance draws a peak in a wavelength area where the emission peak, which indicates fluorescent yellow, exists (particularly in the vicinity of 520 nm).

Figure 16:
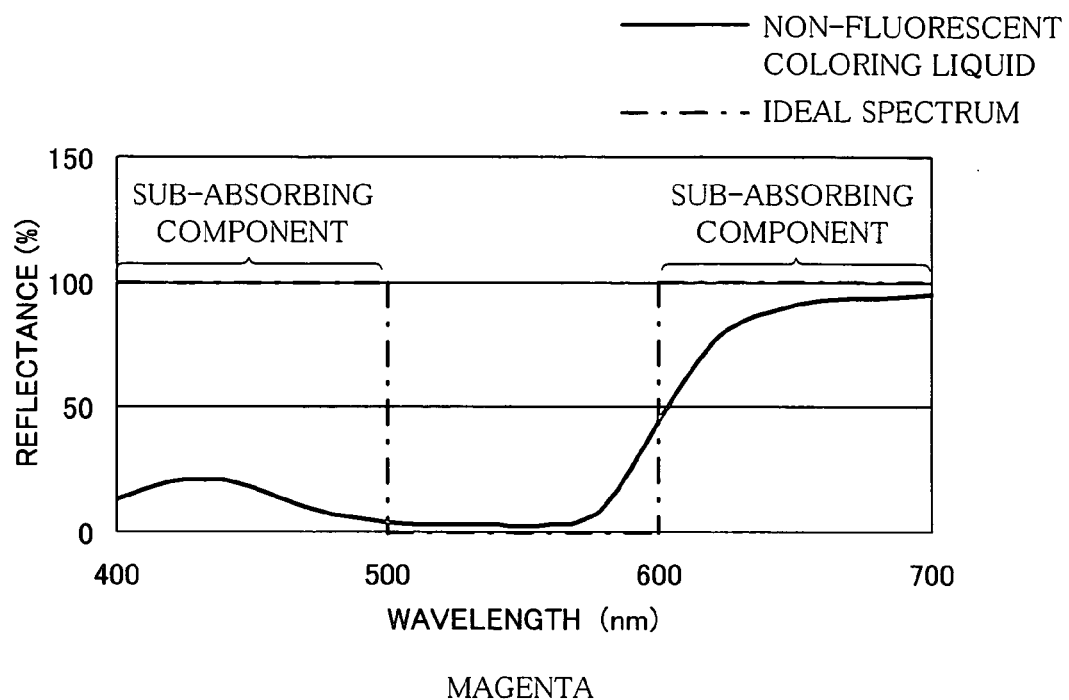
FIG. 16($a$) is a drawing showing an ideal spectral reflectance of magenta and a spectral reflectance of magenta non-fluorescent coloring liquid, and FIG. 16($b$) is a drawing showing an ideal spectral reflectance of yellow and a spectral reflectance of yellow non-fluorescent coloring liquid.
Figure 16:
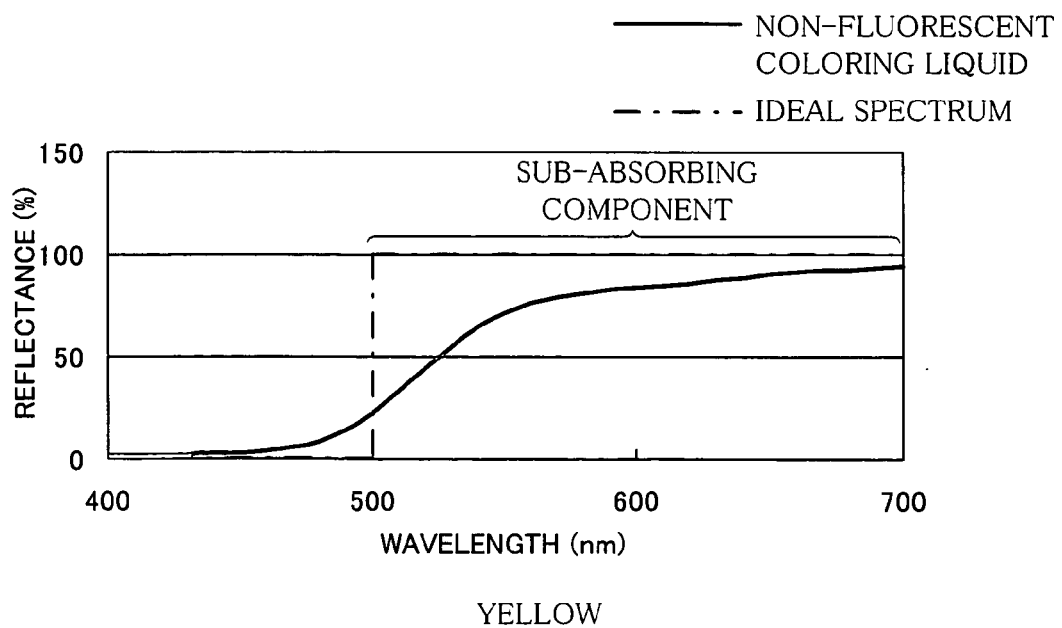

Here, FIG. 16 is referred. FIG. 16(a) is a drawing showing an ideal spectral reflectance of magenta and a spectral reflectance of magenta non-fluorescent coloring liquid, and FIG. 16(b) is a drawing showing an ideal spectral reflectance of yellow and a spectral reflectance of yellow non-fluorescent coloring liquid.

FIG. 16(a) reveals that an ideal magenta color reflects 100% of light of 400 to 500 nm and light of 600 to 700 nm. Further, it is also seen that the actual magenta non-fluorescent coloring agent does not have the ideal spectral reflectance due to inclusion of sub-absorption component (extra absorption component/transmission component).

In view of this, the present embodiment uses a magenta non-fluorescent coloring agent mixed with a magenta fluorescent coloring agent. With this agent, the spectral reflectance increases in the wavelength area (in the vicinity of 430 nm/610 nm) denoting magenta color, thus obtaining a spectral reflectance of magenta closer to the ideal value.

Figure 9:
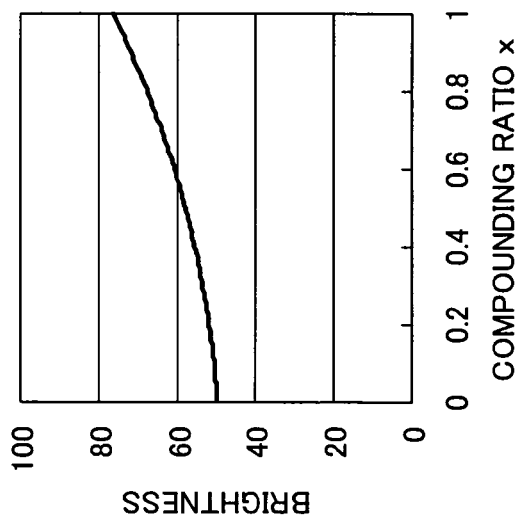
FIG. 9 is a drawing showing hue angle, saturation and brightness of mixed magenta ink that is created by mixing magenta non-fluorescent coloring liquid and magenta fluorescent coloring liquid.
Figure 9:
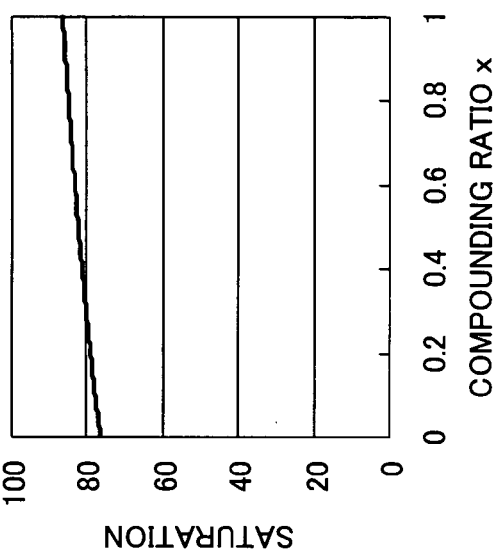
Figure 9:
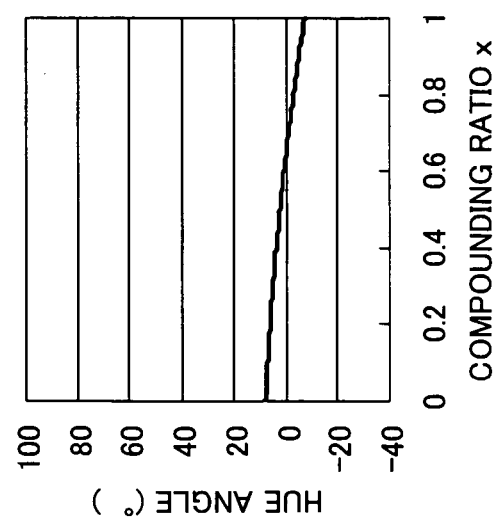
Figure 10:
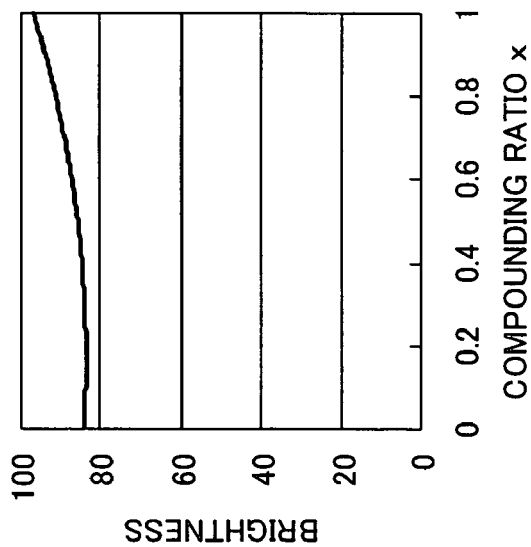
FIG. 10 is a drawing showing hue angle, saturation and brightness of mixed yellow ink that is created by mixing yellow non-fluorescent coloring liquid and yellow fluorescent coloring liquid.
Figure 10:
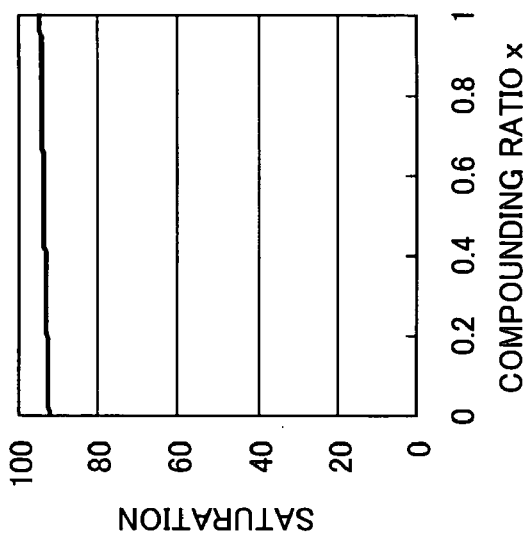
Figure 10:
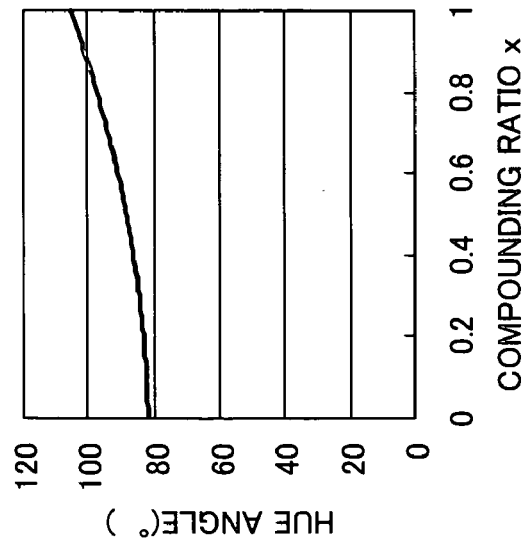

Further, FIGS. 9 and 10 show measurement results of L*a*b* values for each of the compounding ratio above in the case of mixed M ink and mixed Y ink. Further, L*C*H values are calculated by using the measured L*a*b* values for each compounding ratio in accordance with the following formulas (5) through (7), where L* denotes brightness, C* denotes saturation, and H denotes hue angle.

$$L^* = L^* \quad (5)$$

$$C^* = \sqrt{a^{*2} + b^{*2}} \quad (6)$$

$$H = \tan^{-1}\left(\frac{b^*}{a^*}\right) \quad (7)$$

FIG. 9(a) shows hue angle of mixed M ink, FIG. 9(b) shows saturation of the mixed M ink, and FIG. 9(c) shows brightness of the mixed M ink. FIG. 10(a) shows hue angle of mixed Y ink, FIG. 10(b) shows saturation of the mixed Y ink, and FIG. 10(c) shows brightness of the mixed Y ink. Note that, the L*a*b* values are measured with a X-Rite 938 spectrophotometric calorimeter.

As shown in FIG. 9(b) regarding the mixed M ink, the saturation increases with an increase of the compounding ratio of a fluorescent coloring agent. Further, FIG. 9(c) reveals that the brightness of mixed M ink increases with an increase of the compounding ratio of a fluorescent coloring agent. Similarly, as shown in FIG. 10(b) regarding the mixed Y ink, the saturation slightly increases with an increase of the compounding ratio of a fluorescent coloring agent. Further, FIG. 10(c) reveals that the brightness of mixed Y ink increases with an increase of the compounding ratio of a fluorescent coloring agent.

The reason for this is explained as follows. As described above, the spectral reflectance increases with an increase of the ratio of a fluorescent coloring agent with respect to the whole amount of the agent as shown in FIG. 8. Since an increase of the spectral reflectance means increases of tristimulus values XYZ, as shown in the formulas (8) through (10) below, it also causes increases in brightness and saturation.

Further, as shown in FIG. 9, a change in compounding ratio causes a slight change in hue angle of the recording agent containing both a non-fluorescent coloring agent and a fluorescent coloring agent (+10° to −10°). This is because enhancement of reflectance in a specific wavelength area also induces enhancement of color reflected in the wavelength area. Accordingly, as the compounding ratio of a fluorescent coloring agent increases in the mixed M ink or in the mixed Y ink, the color thereof also gradually changes.

Figure 11:
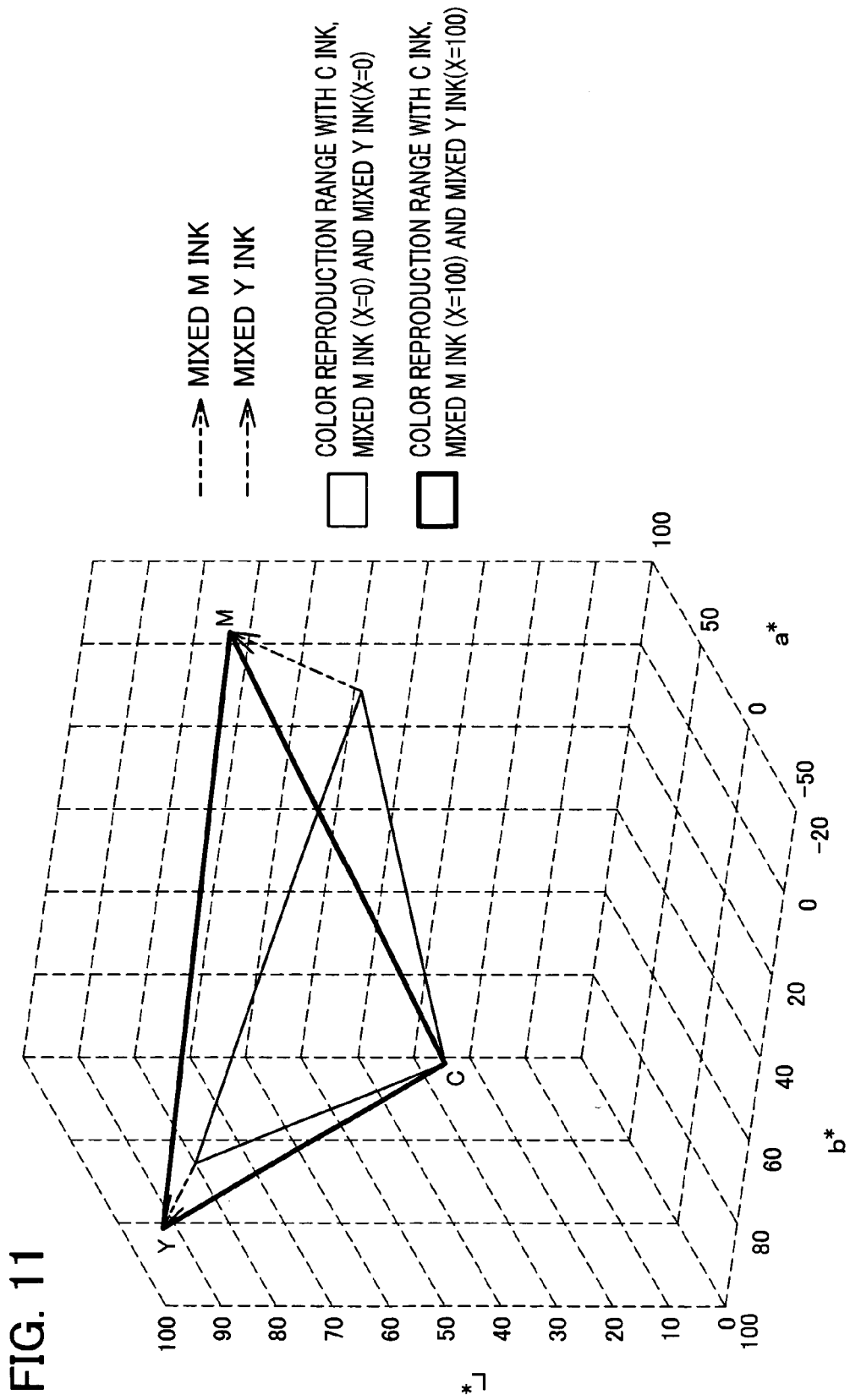
FIG. 11 is a three-dimensional graph showing a L*a*b* space in which the L*a*b* values of the mixed magenta ink and the mixed yellow ink and the L*a*b* values of magenta ink, yellow ink, and cyan ink are plotted.

Next, FIG. 11 shows a L*a*b* space in which the L*a*b* values of the mixed magenta ink and the mixed yellow ink for each compounding ratio, and the L*a*b* values of cyan ink (a non-fluorescent coloring agent) are plotted. This figure shows that, for the mixed magenta ink and in the mixed yellow ink, a change in compounding ratio causes a change in L*a*b* values.

Further, the figure also reveals that, in a subtractive color mixing method using the mixed M ink, the mixed Y ink and the C ink; a color reproduction range increases by 30% when the mixed M ink and the mixed Y ink each contain a fluorescent coloring agent in a compounding ratio satisfying X=1, compared to the case where X=0 (i.e., the respective mixed inks M and Y each contain only a non-fluorescent coloring agent).

Note that, the color reproduction range is calculated with reference to FIG. 11 by comparing areas of triangles made of the L*a*b* values of the C ink, L*a*b* values of the mixed M ink and the L*a*b* values of the mixed Y ink for each case where the ratio of the mixed M ink to the mixed Y ink satisfies x=0 or x=1.

Further, the spectral reflectance of the mixed M ink and the mixed Y ink for each compounding ratio obtained through the foregoing method may be expressed as follows.

$$Rm = (1-x^y)Ro + x^y Rf \tag{6}$$

In Formula (6), Rm expresses the spectral reflectance of a recording agent (mixed ink) created by mixing a non-fluorescent coloring agent and a fluorescent coloring agent, Rf expresses the spectral reflectance of the fluorescent coloring agent, Ro expresses the spectral reflectance of the non-fluorescent coloring agent, and x expresses the compounding ratio.

Next, the following will explain a procedure for determining an optimal value of y of Formula (6). First, the L*a*b* values of the mixed M ink and the mixed Y ink of the present embodiment obtained according to Formula (6) are expressed as $L^*_c$, $a^*_c$ and $b^*_c$. Then, the actual measured values of L*a*b* of the mixed M ink and the mixed Y ink are expressed as $L^*_s$, $a^*_s$ and $b^*_s$.

Here, the difference between $L^*_c$, $a^*_c$ and $b^*_c$ values and $L^*_s$, $a^*_s$ and $b^*_s$ values are expressed as follows.

$$\Delta E = \{(L^*_c - L^*_s)2 + (a^*_c - a^*_s)2 + (b^*_c - b^*_s)2\}(1/2) \tag{7}$$

Next, the following explains a calculation procedure of $L^*_c$, $a^*_c$, $b^*_c$ values. The calculation here for finding $L^*_c$, $a^*_c$, b*c is performed via a XYZ color system. First, tristimulus values XYZ of the XYZ color system are calculated in accordance with the following FIGS. (8) through (11).

$$X = K \int_{400}^{700} S(\lambda)\bar{x}(\lambda)R(\lambda)d\lambda \tag{8}$$

$$Y = K \int_{400}^{700} S(\lambda)\bar{y}(\lambda)R(\lambda)d\lambda \tag{9}$$

$$Z = K \int_{400}^{700} S(\lambda)\bar{z}(\lambda)R(\lambda)d\lambda \tag{10}$$

$$K = 100 \Big/ \int_{400}^{700} S(\lambda)\bar{y}(\lambda)d\lambda \tag{11}$$

where $\bar{x}(\lambda)$, $\bar{y}(\lambda)$ and $\bar{z}(\lambda)$ express color matching functions of a XYZ color system; $R(\lambda)$ expresses spectral reflectance factor; and $S(\lambda)$ expresses spectral distribution of light source (standard light for color display, such as $D_{65}$).

Here, a function of Rm obtained by a modified Formula (6) is substituted for $R(\lambda)$ showing spectral reflectance factor. Further, it is assumed that the light source of the foregoing calculation is the same as that used for finding $L^*_s$, $a^*_s$, $b^*_s$ values.

Then, $L^*_c$, $a^*_c$, $b^*_c$ values are obtained by substituting the values of XYZ found by Formulas (8) through (11) in the following Formulas (12) through (14).

$$L_c^* = 116(Y/Yn)^{(1/3)} - 16 \tag{12}$$

$$a_c^* = 500\{(X/Xn)^{(1/3)} - (Y/Yn)^{(1/3)}\} \tag{13}$$

$$b_c^* = 200\{(Y/Yn)^{(1/3)} - (Z/Zn)^{(1/3)}\} \tag{14}$$

where Xn, Yn and Zn express tristimulus values on a perfect reflecting diffuser.

With these $L^*_c$, $a^*_c$, $b^*_c$ values thus obtained, ΔE of Formula (14) is found. This ΔE may be expressed as a function of y. Further, ΔE is found by changing the value of y according to a predetermined step.

Figure 12:
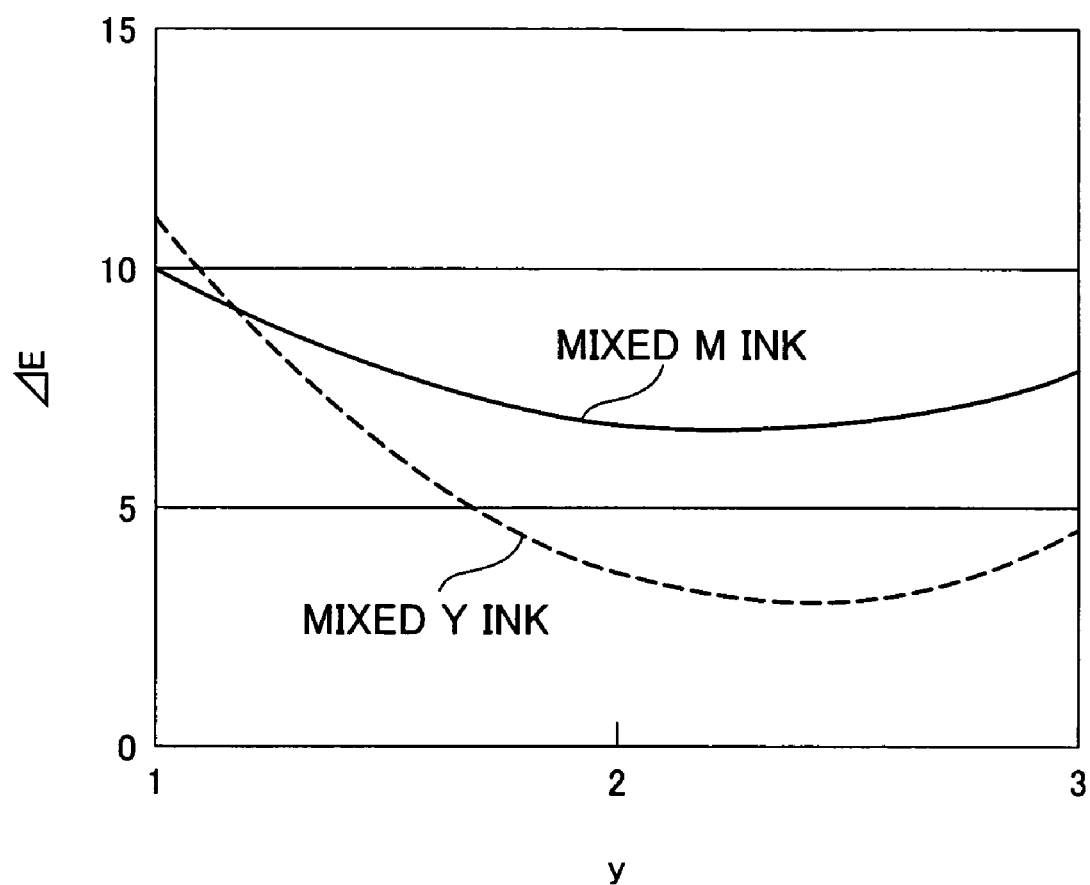
FIG. 12 is a graph showing the difference between colors of mixed magenta ink and mixed yellow ink that are created by actually mixing non-fluorescent coloring liquid and fluorescent coloring liquid, and the colors found by calculation. This graph shows the color difference ΔE as a function of y.

FIG. 12 shows the color difference ΔE obtained in the foregoing manner. Note that, the final value of the color difference ΔE according to the foregoing calculation is determined as the average value of the ΔE values in the respective cases where x=0.25, x=0.5 and x=0.75.

FIG. 12 indicates that the value of the parameter y for giving the smallest value of the color difference ΔE is y≈2.3 for M ink, and y≈2.5 for Y ink. In this way, the optimal value of y in Formula (6) can be found.

Further, by using in Formula (6) the value of the parameter y for giving the smallest value of the color difference ΔE, and using the spectral reflectance Rm found by Formula (6) thus calculated, it is possible to find the optimal compounding ratio for the desired color of the recording agent. Namely, the compounding ratio for giving the smallest value of the color difference ΔE to the L*a*b* values of the desired color of the recording agent can be found by previously finding the L*a*b* values of the desired color of the recording agent, and then finding the optimal L*a*b* values by changing the compounding ratio according to a predetermined step.

To be more specific, by using the condition y≈2.5 when the L*a*b* values showing the desired color of Y ink is (L*a*b*)=(85, 2, 80), it is possible to obtain the optimal compounding ratio for giving the smallest value of ΔE, which is X=0.45.

As described, the ink (recording agent) of a color component according to the present embodiment is created by a non-fluorescent coloring agent mixed with a fluorescent coloring agent of the same hue. Further, this ink has a higher spectral reflectance than that of a non-fluorescent coloring agent. Therefore, the ink is the same in hue range as a non-fluorescent coloring agent, but higher in brightness and saturation than the non-fluorescent coloring agent. In other words, the ink created by a non-fluorescent coloring agent mixed with a fluorescent coloring agent has the same hue range as that of the non-fluorescent coloring agent, but performs reproduction with colors higher in brightness and saturation, which cannot be achieved by a recording agent made only of a non-fluorescent coloring agent.

On this account, by using the ink created by a non-fluorescent coloring agent mixed with a fluorescent coloring agent as color components for an image forming process that is performed through subtractive color mixing, it is possible to reproduce color higher in brightness and saturation, which cannot be achieved by a recording agent made only of a non-fluorescent coloring agent, thus easily enlarging color reproduction range.

Further, the ink of a color component according to the present embodiment containing a fluorescent coloring agent has a higher spectral reflectance than that of a non-fluorescent coloring agent which is also contained in the ink. That is, the ink has the same hue range as that of the non-fluorescent coloring agent contained therein, but its characteristic is more similar to an ideal spectral reflectance in the hue than the non-fluorescent coloring agent. Therefore, by performing a subtractive color mixing process with this ink, the reproduced image can be improved in quality.

Further, a fluorescent coloring agent allows reproduction of colors with superior brightness and vividness than a non-fluorescent coloring agent. Therefore, the ink created by a non-fluorescent coloring agent mixed with a fluorescent coloring agent has the same hue range as that of the non-fluorescent coloring agent, but enables reproduction with brighter or more vivid colors. Thus, color reproduction by a subtractive color mixing method using the ink allows color reproduction superior in brightness and vividness, which cannot be achieved by a subtractive color mixing method using a recording agent made only of a non-fluorescent coloring agent.

Further, if the spectral reflectance of a non-fluorescent coloring agent is expressed as Ro, and the spectral reflectance of a fluorescent coloring agent is expressed as Rf, the foregoing compounding ratio x may be obtained according to Formula (6). The reason for this is explained as follows.

The spectral reflectance of a non-fluorescent coloring agent and the spectral reflectance of a fluorescent coloring agent may be measured in advance. Accordingly, it can be assumed that the spectral reflectance of a recording agent created by a non-fluorescent coloring agent mixed with a fluorescent coloring agent may be approximately found by using the spectral reflectance of the non-fluorescent coloring agent and the fluorescent coloring agent. This assumption actually works by setting the value y to $2 \leq y \leq 3$ in Formula (6). Under this condition, the calculation result becomes substantially identical to the measurement value expressed by the L*a*b* values (i.e., the color difference becomes minimum). In this way of calculation, the compounding ratio of the target recording agent can be found. Namely, the L*a*b* values for the desired color may be found by calculation without measurement.

Second Embodiment

Figure 14:
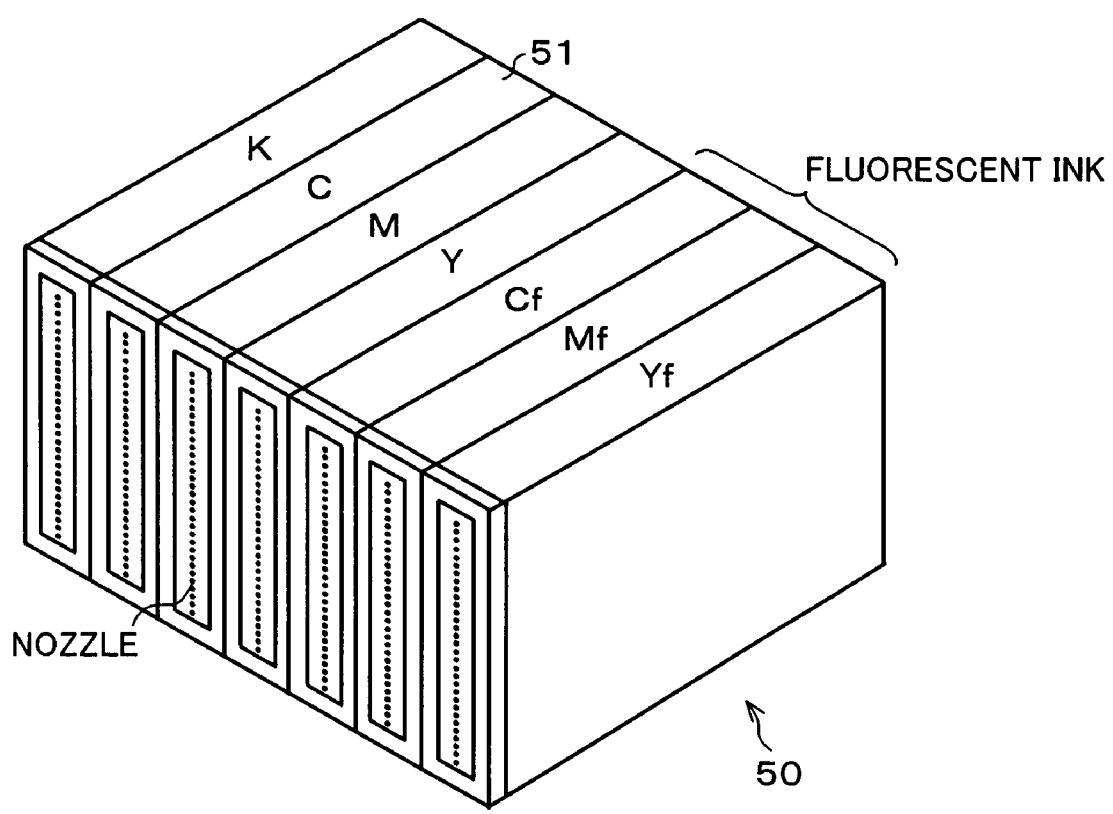
FIG. 14 is a perspective view illustrating a head provided in an image output device according to another embodiment of the present invention.

Another embodiment of the present invention will be described below with reference to FIG. 14. For ease of explanation, materials having the equivalent functions as those shown in the drawings pertaining to the first embodiment above will be given the same reference symbols, and explanation thereof will be omitted here.

The present embodiment uses an image output device (image forming device) as an inkjet printer which includes a head 50. Compared to the head 21 used in the first embodiment, which has the ink tanks 30 storing inks of color components created by mixing a non-fluorescent coloring agent and a fluorescent coloring agent, the head 50 here contains a non-fluorescent coloring liquid and a fluorescent coloring liquid individually in separate ink tanks 51.

More specifically, as explained below, the present embodiment allows reproduction by discharging a non-fluorescent coloring liquid and a fluorescent coloring liquid in the same hue, that are individually stored in the separate ink tanks 51, from separate discharging sections of the head 50, thus creating the desired color by mixing plural coloring liquids on a recording medium. Alternately, the head 50 may discharge the non-fluorescent coloring liquid and the fluorescent coloring liquid individually stored in the separate ink tanks 51 onto adjacent portions of the recording medium so as to reproduce the desired color by area ratio gradation.

The head 50 of the image output device used in the present embodiment differs in structure from the head 21 of the first embodiment. As shown in FIG. 14, the head 50 has plural ink tanks containing non-fluorescent coloring liquids of plural colors, such as C(Cyan), M(Magenta), Y(Yellow) and K(Black), as well as Cf (Cyan fluorescent coloring liquid), Mf (Magenta fluorescent coloring liquid) and Yf (Yellow fluorescent coloring liquid).

Here, the non-fluorescent coloring liquids of C, M, Y and K stored in the respective ink tanks 51 each do not contain a fluorescent coloring liquid. Then, these non-fluorescent coloring liquids and the fluorescent coloring liquids listed above are discharged by the head 50 according to digital data sent from the output conversion section 19 so as to form an image on the recording medium. This operation is performed in one of the following two kinds of procedures.

The following explains a procedure of discharging a non-fluorescent coloring liquid and a fluorescent coloring liquid in the same hue onto the same portion on the recording medium through the head 50 so as to mix the two coloring liquids.

First, the compounding ratio x of the non-fluorescent coloring liquid and the fluorescent coloring liquid is found with respect to the target image data to be outputted by using a non-fluorescent coloring liquid and a fluorescent coloring liquid. Here, this ratio is found according to Formula (6) by the manner used in the first embodiment with a parameter y previously set to y=2.4 (the average value of y≈2.3 and y≈2.5). In the case of reproducing plural images, each of which uses both a non-fluorescent coloring liquid and a fluorescent coloring liquid, the compounding ratio should be found for each data and stored in the form of, for example, a table. The type of image data is detected by the color compensation section 14 and the table is stored in the output compensation section 19. The output compensation section 19 reads out the corresponding compounding ratio from the table according to a color judgment signal sent from the color compensation section 14. This compounding ratio x thus read out is the optimal compounding ratio for giving the smallest value of ΔE, color difference with the actual outputted color.

Further, with the optimal compounding ratio obtained in such a manner, a non-fluorescent coloring liquid and a fluorescent coloring liquid in the same hue are discharged from separate discharging sections of the head 50 onto adjacent portions of the recording medium so as to mix plural kinds of liquid on a recording medium. In this way, it is possible to obtain a greater color reproduction range than an image forming method using only a non-fluorescent coloring liquid. Note that, since the fluorescent coloring liquid to be mixed with the non-fluorescent coloring liquid belongs to the same hue as the non-fluorescent coloring liquid, it ensures hue uniformity when mixing plural types of coloring liquid.

Next, the following explains a procedure of discharging a non-fluorescent coloring liquid and a fluorescent coloring liquid by the head 50 to adjacent portions of the recording medium so as to create a desirable ink by area ratio gradation. In this case, the non-fluorescent coloring liquid and the fluorescent coloring liquid do not have to have the same hue.

It is known that color reproduction is degraded when two different non-fluorescent coloring liquids overlaid with each other are simultaneously reproduced. However, simultaneous reproduction of a non-fluorescent coloring liquid and a fluorescent coloring liquid has to be carried out with more strict restriction than the reproduction with two colors of non-fluorescent coloring liquid, since a fluorescent coloring liquid has higher brightness and/or saturation than a non-fluorescent coloring liquid, and therefore the simultaneous reproduction may degrade the high brightness and/or saturation.

The compounding ratio x is found according to Formula (6) by the manner used in the first embodiment with the parameter y previously set to y=2.4 (the average value of y≈2.3 and y≈2.5). An example of desirable value of y here may be a value not less than and close to 1. The reason for this example value is based on the fact that area ratio gradation in which a non-fluorescent coloring liquid and a fluorescent coloring liquid are not overlaid causes no interference therebetween, and also the adjacent discharging of the two liquids causes only a little interference therebetween. Therefore, the contribution ratio of reflection light (spectral reflectance) of a non-fluorescent coloring liquid to a fluorescent coloring liquid is preferably set to 1:1 or a similar ratio.

Accordingly, the non-fluorescent coloring liquid and the fluorescent coloring liquid at the appropriate compounding ratio are discharged from separate discharging sections onto adjacent portions of the recording medium, so as to reproduce the desired color by area ratio gradation. In this way, it is possible to obtain a wider color reproduction range than an image forming method using only a non-fluorescent coloring liquid.

As described, the image output device according to the present embodiment includes the head 50 which discharges a non-fluorescent coloring liquid of a color component for subtractive color mixing, and a fluorescent coloring liquid in the same hue from separate discharging sections. With this function, the non-fluorescent coloring liquid and the fluorescent coloring liquid may be applied onto the same or adjacent portions of the recording medium. Thus, it is possible to mix a non-fluorescent coloring liquid and a fluorescent coloring liquid in the same hue on the recording medium, thus creating a color component identical in hue to the non-fluorescent coloring liquid.

The color components thus created has a higher spectral reflectance than that of the non-fluorescent coloring liquid. Therefore, the color component created by the foregoing image forming device is the same in hue range as the non-fluorescent coloring liquid, but higher in brightness and/or saturation than the non-fluorescent coloring liquid. In other words, the color component created by the foregoing image forming device has the same hue range as that of the non-fluorescent coloring liquid, but performs reproduction with colors of high brightness and/or saturation, which cannot be achieved by a recording liquid made only of a non-fluorescent coloring liquid.

On this account, by carrying out color reproduction through subtractive color mixing with the foregoing image forming device, it is possible to reproduce color higher in brightness and/or saturation, which cannot be achieved by non-fluorescent coloring liquids of the respective color components, thus enlarging color reproduction range.

Further, in the present embodiment, the non-fluorescent coloring liquid and the fluorescent coloring liquid are applied onto substantially identical portions, and therefore the non-fluorescent coloring liquid and the fluorescent coloring liquid are mixed on the portion of the recording medium. As a result, it is possible to create a color component having the same hue range as that of the non-fluorescent coloring liquid, but has a higher spectral reflectance than that of the non-fluorescent coloring liquid.

Alternately, the non-fluorescent coloring liquid and the fluorescent coloring liquid may be applied onto adjacent portions of the recording medium. In this way, image reproduction is carried out by area ratio gradation by using a non-fluorescent coloring liquid and a fluorescent coloring liquid, thus creating a color component having a higher spectral reflectance than that of the non-fluorescent coloring liquid.

Third Embodiment

Still another embodiment of the present invention will be described below with reference to FIG. 15.

Figure 15:
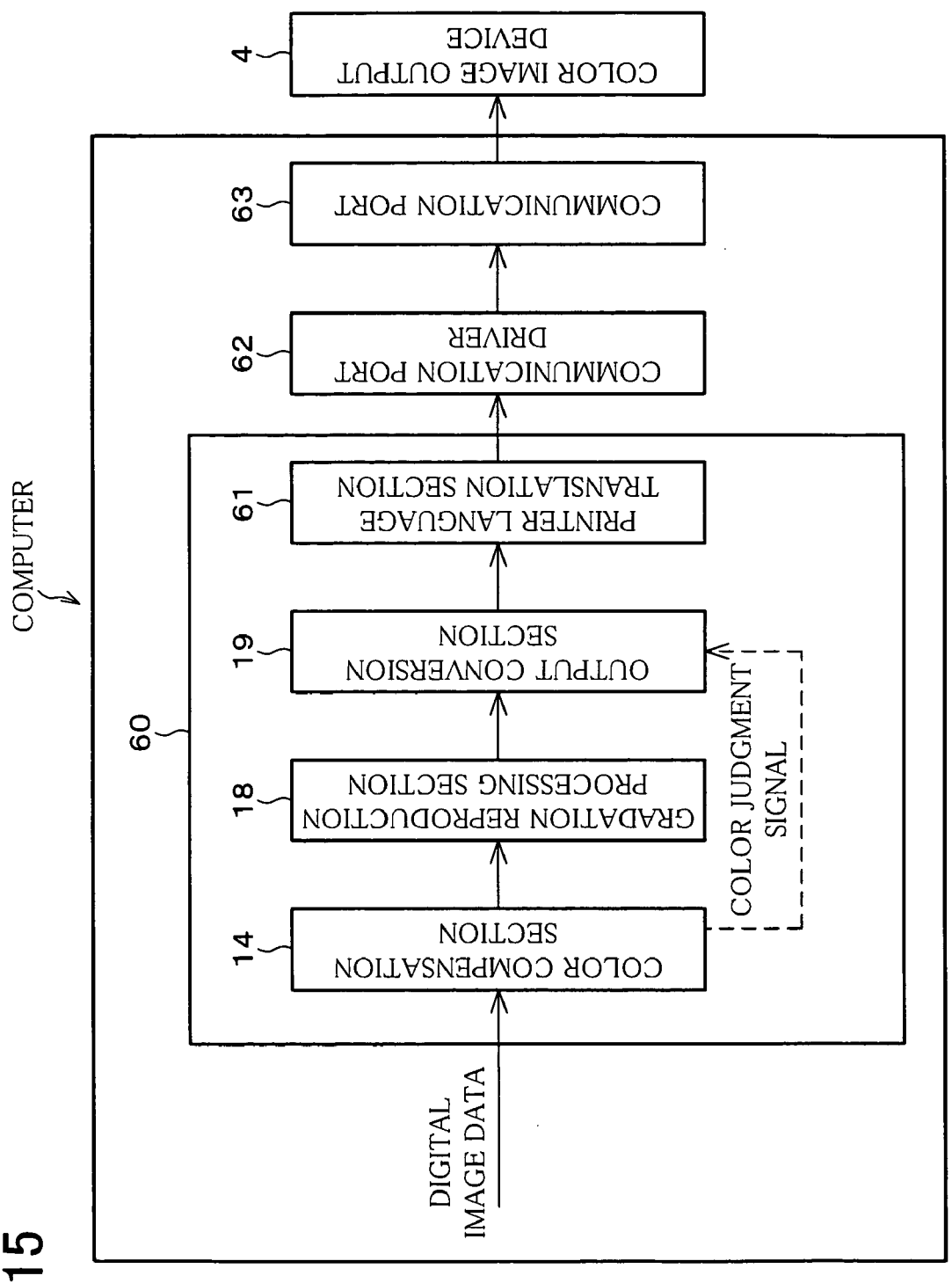
FIG. 15 is a block diagram illustrating a structure of a computer according to another embodiment of the present invention.

For a different feature from the second embodiment, the present embodiment uses an image processing device included in the computer of FIG. 15. Accordingly, the following description relates to only this difference, and materials having the equivalent functions as those shown in the drawings pertaining to the first embodiment above will be given the same reference symbols, and explanation thereof will be omitted here.

The image forming method according to the present embodiment may perform image processing with respect to a predetermined image data (such as image data having high brightness and/or saturation) with one of the following steps of: 1) Using a recording agent created by mixing a non-fluorescent coloring liquid and a fluorescent coloring liquid identical in hue at a predetermined compounding ratio, 2) Discharging a non-fluorescent coloring liquid and a fluorescent coloring liquid identical in hue onto substantially identical portions on a recording medium at a fixed ratio suitable to the image data, and 3) Discharging a non-fluorescent coloring liquid and a fluorescent coloring liquid identical in hue onto adjacent portions on a recording medium at a fixed ratio suitable to the image data, by using a printer driver 60 provided in the computer.

Digital image data generated by enforcing various application programs in the computer is subjected to image processing by the color compensation section 14, the gradation reproduction processing section 18 and the output conversion section 19. Note that, in the present embodiment, the color compensation section 14 also carries out black generation undercolor removal operation.

The digital image data having been through output conversion processing by the output conversion section 19 is then converted into printer language by a printer language translation section 61, and is inputted into an inkjet recording device (printer) which functions as the image output device 4 via a communication port driver 62, a communication port (RS232C, LAN etc.) 63. Here, the image output device 4 may be a digital multi-functional device that is provided with photocopier function and/or a facsimile function in addition to the printer function.

Further, though the present embodiment describes a structure in which the printer driver is provided to a computer, the present invention is not limited to this structure, but may use a printer driver provided to a printer (inkjet recording device) which functions as the image output device 4.

Referring again to the foregoing Document 1 (Japanese Laid-open Patent Publication Tokukai 2000-181170), it should be noted that this publication has no description of the method of mixing a non-fluorescent coloring liquid and a fluorescent coloring liquid identical in hue in order to ensure hue uniformity.

More specifically, the Document 1 merely describes a peak wavelength of a fluorescent coloring liquid that is mixed into the non-fluorescent coloring liquid of the color component, and has no description regarding its emission spectrum or the color. For example, the Document 1 has description such that "the yellow toner is mixed with a fluorescent material whose emission peak is 540 nm" but this fluorescent material having emission peak of 540 nm is not necessarily a yellow fluorescent material but can be a green fluorescent material. If a yellow toner is mixed with a green fluorescent material, the original color of yellow toner changes since a fluorescent material generally includes both its color component (reflection color) and an emission component (fluorescent). Further, even when the absorption peak of the toner and the emission peak of the fluorescent material exist in the same wavelength area, the fluorescent material with a broader emission spectrum may induce a reverse effect in the main absorption area.

In contrast, the recording agent, i.e., ink of the respective color components according to the first embodiment of the present invention offers a higher spectral reflectance with a constitution in which a non-fluorescent coloring liquid containing no fluorescent materials is mixed with a fluorescent coloring liquid which is identical in hue to the non-fluorescent coloring liquid. Therefore, this ink offers a wider color reproduction range upon image forming than a coloring agent made of a color component containing no fluorescent materials; besides, it ensures hue uniformity even when mixed with a fluorescent material, thus preventing degradation of picture quality due to addition of a fluorescent material.

Further, the Document 1 has no description regarding a method of mixing on a recording medium a non-fluorescent coloring liquid and a fluorescent coloring liquid identical in hue, or a method of discharging them onto the same portion or adjacent portions of the recording medium so as to reproduce the desired color by area ratio gradation.

In contrast, the recording agent, i.e., ink of the respective color components according to the first embodiment of the present invention offers a higher spectral reflectance with a constitution in which a non-fluorescent coloring liquid containing no fluorescent materials is mixed with a fluorescent coloring liquid which is identical in hue to the non-fluorescent coloring liquid Further, in the second and third embodiments, the higher spectral reflectance of the non-fluorescent coloring liquid is achieved by mixing on a recording medium a non-fluorescent coloring liquid and a fluorescent coloring liquid identical in hue.

Therefore, this ink offers a wider color reproduction range upon image forming than a coloring agent made of a color component containing no fluorescent materials; besides, it ensures hue uniformity even when mixed with a fluorescent material, thus preventing degradation of picture quality due to addition of a fluorescent material.

Further, the image forming methods according to the second and third embodiments of the present invention realize image forming with a wider color reproduction range than that using only a coloring agent made of a color component containing no fluorescent materials; besides, it ensures hue uniformity of the formed image also in the method of discharging a fluorescent coloring liquid onto a recording medium, thus maintaining picture quality.

The recording agent of the present invention may be a recording agent containing a first coloring liquid and a second coloring liquid having the same hue as the first coloring liquid, so that the recording agent has a higher spectral reflectance than that of the first coloring liquid as a result of mixture of the first and second coloring liquid.

With this arrangement, mixture of two kinds of liquid creates a recording agent with a higher spectral reflectance than that of the first coloring liquid, thus realizing color control.

Namely, the use of a recording agent created by mixing a dye (non-fluorescent coloring liquid) as the first coloring agent and a recording agent containing a fluorescent coloring liquid as the second coloring agent enables image forming with a wider color reproduction range than the single use of a coloring agent of a dye. For example, when the first coloring material is a yellow dye, the second coloring agent should be a yellow fluorescent coloring liquid (this rule also applies to the case of magenta). These first and second agents differ in some degree in brightness, saturation and hue; and therefore, they are mixed at an arbitrary ratio so as to create a recording agent of the desired color.

Further, in addition to the foregoing arrangement, the recording agent of the present invention may contain a fluorescent coloring liquid as the second coloring agent. With this arrangement, it is possible to easily realize enlargement of color reproduction range and color control.

Further, in addition to the foregoing arrangement, the recoding agent of the present invention is made of the first coloring agent having spectral reflectance Ro and the second coloring agent having spectral reflectance of Rf, and the recording agent contains the second coloring agents in a compounding ratio of x in order to have a higher spectral reflectance than that of the first coloring agent. The spectral reflectance Rm of the created recording agent may be expressed by the following formula using a parameter y (y is a positive real number).

$Rm=(1-x^y)Ro+x^yRf$

In this manner, it is possible to find an appropriate compounding ratio for obtaining small color difference with the actual color according to the formula for calculating the spectral reflectance Rm of the recording agent.

Further, it is preferable that the parameter y in the formula above is in a range of 2 to 3. By setting this range, it is possible to find an appropriate compounding ratio for giving the smallest color difference with the actual color.

Further, the recording method of the present invention may be characterized by carrying out image forming on a recording medium with the foregoing recording agent. The recording agent of this arrangement offers a wider color reproduction range and suppresses the color difference with the actual color, thus outputting a high quality image.

Further, in the recording method of the present invention for forming an image with a recording agent containing a first coloring liquid, and a second coloring liquid having the same hue as the first coloring liquid, so as to obtain higher spectral reflectance than that of the first coloring liquid, the first coloring agent and the second coloring agent may be separately applied onto a recording medium so as to form the desired image.

This recording method may be carried out by, for example, separately applying the first coloring agent and the second coloring agent onto substantially the same portions of the recording medium and mix the two coloring agents on the recording medium to form the desired image. Further, the recording method may be carried out by, for example, separately applying the first coloring agent and the second coloring agent onto adjacent portions of the recording medium to form the desired image by area ratio gradation. With these methods, the coloring agents may be applied either onto substantially the same portions or adjacent portions by various compounding ratio according to the desired color. Accordingly, for example, the image forming may be performed by a recording agent mixed by an appropriate ratio, thus further improving picture quality.

Further, in addition to the foregoing arrangement, the present invention may be a recording agent satisfying Rm= $(1-x^y)$ Ro+$x^y$Rf by using a parameter y (y is a positive real number), where Ro expresses the spectral reflectance of the first coloring liquid, Rf expresses the spectral reflectance of the second coloring liquid, x expresses compounding of the second coloring liquid of the recording agent, and Rm expresses the spectral reflectance of the created recording agent; wherein the first coloring agent and the second coloring agent are individually applied to substantially the same portion on the recording medium in the compounding ratio x so as to mix two liquids on the recording medium.

Accordingly, the coloring agents may be applied by a desirable compounding ratio. Thus, for example, by performing recording by the coloring agents mixed by an appropriate ratio, it is possible to improve picture quality.

Further, the present invention may be enforced as a recording device for forming an image on a recording medium with the foregoing recording method. This recording device performs image forming with a wider color reproduction range while suppressing the color difference with the actual color, thus outputting a high quality image.

Further, the present invention may be enforced as a recording medium on which an image is recorded through the foregoing recording method. In this case, it is possible to obtain a recording medium with a high quality printed image.

In order to solve the foregoing problems, an image forming method according to the present invention forms an image through subtractive color mixing by using a recording agent of plural color components different in hue, the recording agent containing a first coloring agent expressing one of the color components and a second coloring agent identical in hue to the first coloring agent, the recording agent having a higher spectral reflectance than a spectral reflectance of the first coloring agent.

In this arrangement, the recording agent is created by mixing the first coloring agent indicating a color component for subtractive color mixing, and the second coloring agent identical in hue to the first coloring agent. Further, this recording agent has a higher spectral reflectance than that of the first coloring agent. On this account, by using the recording agent as the color component for subtractive color mixing, it is possible to reproduce color higher in brightness and saturation than the use of the first coloring agent, thus enlarging color reproduction range.

Here, the following explains a reason why the saturation of the recording agent becomes higher than that of the first coloring agent when the spectral reflectance of the recording agent is higher than that of the first coloring agent.

The way of color perception by human's eyes can be expressed by tristimulus values XYZ, shown in the formulas (15) through (17) below.

$$X = K \int_{400}^{700} S(\lambda)\bar{x}(\lambda)R(\lambda)d\lambda \tag{15}$$

$$Y = K \int_{400}^{700} S(\lambda)\bar{y}(\lambda)R(\lambda)d\lambda \tag{16}$$

$$Z = K \int_{400}^{700} S(\lambda)\bar{z}(\lambda)R(\lambda)d\lambda \tag{17}$$

$$K = 100 \Big/ \int_{400}^{700} S(\lambda)\bar{y}(\lambda)d\lambda \tag{18}$$

where $\bar{x}(\lambda)$, $\bar{y}(\lambda)$ and $\bar{z}(\lambda)$ express color matching functions of a XYZ color system; $R(\lambda)$ expresses spectral reflectance factor; and $S(\lambda)$ expresses spectral distribution of light source (standard light for color display, such as $D_{65}$).

Here, it is assumed that the spectral reflectance factor $R(\lambda)$ is identical to the spectral reflectance of the foregoing recording agent.

Further, the L*a*b* values according to the L*a*b* color system (CIE: Commission International de l'Eclairage: International lighting committee/L*: Brightness, a* and b*: chroma) are associated with the tristimulus values XYZ above as shown in Formulas (19) through (21) below.

$$L^* = 116(Y/Yn)^{(1/3)} - 16 \tag{19}$$

$$a^* = 500\{(X/Xn)^{(1/3)} - (Y/Yn)^{(1/3)}\} \tag{20}$$

$$b^* = 200\{(Y/Yn)^{(1/3)} - (Z/Zn)^{(1/3)}\} \tag{21}$$

where Xn, Yn and Zn express tristimulus values on a perfect reflecting diffuser.

Here, it is assumed that the spectral reflectance of the recording agent is higher than that of the first coloring agent. In this case, since the respective tristimulus values XYZ increase with an increase of the value of $R(\lambda)$, the brightness L* tends to increase. Also, since the saturation relies on the level relationship between XYZ, the level relationship of XYZ can be assumed based on the spectral reflectance of cyan, magenta and yellow as follows.

Cyan: Z>X≧Y
Magenta: X>Z>Y
Yellow: X≈Y>Z

Accordingly, the chromas a* and b* both increase as the value R(λ) increases, thus increasing saturation.

Note that, the foregoing method allows control of the compounding of the second coloring agent at an arbitrary ratio, and therefore it allows the use of plural different color components within the same hue range. In contrast, in the method of the Document 1 (see Paragraph 0065), an increase of the compounding ratio causes less increase of color reproduction. In this view, it is likely that the method of Document 1 has some difficulties to achieve the foregoing enlargement of color reproduction range.

Further, the method of the Document 1 uses a recording agent in which general ink as color components used for subtractive color mixing is mixed with a fluorescent material having a reflectance peak in the same wavelength area as the reflectance peak of the general ink. In this way, it is possible to cancel sub-absorbency in the reflectance peak, thus achieving enlargement of color reproduction range upon image forming through subtractive color mixing. However, since "the fluorescent material having a reflectance peak in the same wavelength area as that of the ink" also contains a fluorescent material different in hue from the ink, there causes a problem of a change in hue of the general ink as a result of addition of the fluorescent material. Accordingly, the method fails to maintain hue uniformity of the general ink of color components for subtractive color mixing, thus raising a possibility of image quality degradation in reproducing an image through subtractive color mixing. On the other hand, the present invention provides a technology immune to such a possibility of image quality degradation since the first coloring agent and the second coloring agent are identical in hue.

In order to solve the foregoing problems, a recording agent according to the present invention is a recording agent of a color component used for color reproduction through subtractive color mixing, the recording agent mainly containing a first coloring agent expressing the color component and a second coloring agent identical in hue to the first coloring agent, the recording agent having a higher spectral reflectance than a spectral reflectance of the first coloring agent.

With this arrangement, the recording agent mainly contains a first coloring agent expressing one of the color components for subtractive color mixing and a second coloring agent identical in hue to the first coloring agent. Further, this recording agent has a higher spectral reflectance than the first coloring agent. Therefore, the recording agent is the same in hue range as the first coloring agent, but higher in brightness and/or saturation than the first coloring agent. In other words, the recording agent mainly containing the first and second coloring agents has the same hue range as that of the first coloring agent, but performs reproduction with colors of high brightness and/or saturation, which cannot be achieved by a recording liquid made only of the first coloring agent. On this account, by using the foregoing coloring agent as a color component for subtractive color mixing, it is possible to reproduce color higher in brightness and/or saturation, which cannot be achieved by composition of first coloring liquid and another coloring liquid having different hue, thus enlarging color reproduction range.

In addition to the foregoing arrangement, the recording agent according to the present invention is arranged so that: the first coloring agent is a non-fluorescent coloring agent and the second coloring agent is a fluorescent coloring agent.

With this arrangement, since the recording agent is created by mixing a non-fluorescent coloring agent and a fluorescent coloring agent, the luminance component of the fluorescent coloring agent suppresses the sub-absorption component (extra absorption component/transmission component) of the non-fluorescent coloring agent. As a result, the spectral reflectance of the recording agent becomes higher than that of the first coloring agent.

Further, a fluorescent coloring agent allows reproduction of colors with superior brightness and vividness than a non-fluorescent coloring agent. Therefore, the recording agent created by mixing a non-fluorescent coloring agent and a fluorescent coloring agent has the same hue range as that of the non-fluorescent coloring agent, but enables reproduction with brighter or more vivid colors due to luminance characteristic of a fluorescent material. Thus, color reproduction through subtractive color mixing using such a recording agent allows color reproduction superior in brightness and vividness, which cannot be achieved by subtractive color mixing using a recording agent made only of a non-fluorescent coloring agent. For example, when image data is scanned by an image input device and is outputted by an image output device, saturation of the input image data is unified after a certain value (saturated) in some cases if the image data is formed only by a non-fluorescent coloring agent. In this case, the recording agent created by mixing a non-fluorescent coloring agent and a fluorescent coloring agent allows color reproduction more similar to the colors of the input image.

In addition to the foregoing arrangement, the recording agent according to the present invention is arranged so that: the recording agent contains the second coloring agent in a compounding ratio of x, which is given by:

$$Rm=(1-x^y)Ro+x^yRf$$

(y is a predetermined constant and a positive real number), where Ro expresses the spectral reflectance of the first coloring agent, Rf expresses a spectral reflectance of the second coloring agent, Rm expresses the spectral reflectance of the recording agent created by mixing the first coloring agent and the second coloring agent.

Here, as described, the spectral reflectance and the tristimulus values XYZ may be associated with each other as shown in FIGS. (15) through (17). Further, the L*a*b* values and the tristimulus values XYZ may also be associated with each other as shown in FIGS. (19) through (21).

The compounding ratio x can be found as follows. First, the L*a*b* values (desired values) of the desired color of the recording agent is decided in advance. Meanwhile, the spectral reflectance of the first coloring agent and the spectral reflectance of the second coloring agent can be measured in advance. Then, the spectral reflectance of the recording agent obtained by an arbitrary compounding ratio of the second coloring agent is calculated according to the Formula: $Rm=(1-x^y)Ro+x^yRf$. Further, the resulting spectral reflectance is substituted in the value R(λ) of the FIGS. (15) through (17) and then the L*a*b* values are calculated in accordance with FIGS. (19) through (21). In this manner, it is possible to obtain the L*a*b* values of the recording agent created with the arbitrary compounding ratio of the second coloring agent.

Further, by repeating this calculation at random with different compounding ratios until the resulting L*a*b* values become substantially identical to the desired color of the recording agent (i.e., until the color difference becomes minimum), it is possible to find an appropriate compounding ratio.

Note that, the value S(λ) in FIGS. (15) through (17) may be a spectral distribution of a standard light source, for example. In this manner, the compounding ratio x of the second coloring agent with respect to the recording agent may be easily found based on the Formula: $Rm=(1-x^y) Ro+x^y Rf$, without actually mixing real coloring agents to confirm the desired color.

In addition to the foregoing arrangement, the recording agent according to the present invention is arranged so that: the y as a predetermined constant and a positive real number satisfies $2 \leq y \leq 3$.

The parameter y as a predetermined constant and a positive real number is set in a range of $2 \leq y \leq 3$ upon calculation of the spectral reflectance according to the Formula: $Rm=(1-x^y) Ro+x^y Rf$. By setting this range, it is possible to find an appropriate compounding ratio for giving the smallest color difference between the L*a*b* values calculated according to the spectral reflectance Rm with the foregoing Formula and the actual measurement L*a*b* values of a real recording agent created based on the calculated compounding ratio. More specifically, by setting the y to $2 \leq y \leq 3$, the calculated L*a*b* values of the recording agent by using the Formula: $Rm=(1-x^y) Ro+x^y Rf$ becomes similar to the actual color of the recording agent.

In order to solve the foregoing problems, an image forming device according to the present invention includes recording agents of plural color components different in hue so as to form an image on a recording medium through subtractive color mixing, the image forming device including a plurality of head sections with a plurality of discharging sections for individually discharging on the recording medium a first coloring agent expressing one of the color components and a second coloring agent identical in hue as the first coloring agent so as to mix the first coloring agent and the second coloring agent on the recording medium in order to generate a color component having a spectral reflectance higher than a spectral reflectance of the first coloring agent.

With this arrangement, the image forming device includes a plurality of head sections with a plurality of discharging sections for individually discharging the first coloring agent of one of the color components for subtractive color mixing, and the second coloring agent in the same hue. With this function, the first coloring agent and the second coloring agent may be applied onto the same or adjacent portions of the recording medium. Thus, it is possible to mix the first coloring agent and the second coloring agent in the same hue on the recording medium, thus creating a color component identical in hue to the first coloring agent.

Note that, in an image forming device using a recording agent created by previously mixing the first coloring agent and the second coloring agent in the same hue in a specific compounding ratio, the colors to be expressed are automatically determined. On the other hand, the image forming device of the present invention applies the first coloring agent and the second coloring agent from the head sections and then mix the two coloring agents on a recording medium. With this structure, the two coloring agents can be mixed in an arbitrary compounding ratio, thus achieving a wider color reproduction.

Thus, by carrying out color reproduction through subtractive color mixing with this image forming device, it is possible to reproduce colors higher in brightness and/or saturation, which cannot be achieved by the first coloring agent, thus enlarging color reproduction range. Further, since the first and second coloring agents are mixed at an arbitrary ratio, it is possible to obtain a wider color reproduction range than the recording agent containing the first coloring agent and the second coloring agent at a specific ratio.

In addition to the foregoing arrangement, the recording agent according to the present invention is arranged so that: the first coloring agent and the second coloring agent are applied onto substantially identical portions of the recording medium.

With this arrangement, since the first coloring agent and the second coloring agent are individually applied onto the same portion of a recording medium, the first coloring agent and the second coloring agent may be mixed on the portion. As a result, the created color component has the same hue range as that of the first coloring agent but has a higher spectral reflectance than the first coloring agent. Further, the first coloring agent and the second coloring agent may be mixed in an arbitrary compounding ratio, thus expressing a large number of colors.

In addition to the foregoing arrangement, the recording agent according to the present invention is arranged so that: the first coloring agent and the second coloring agent are applied onto adjacent portions of the recording medium from the head sections.

With this arrangement, since the first coloring agent and the second coloring agent are individually applied onto adjacent portions of a recording medium, the first coloring agent and the second coloring agent may be expressed by area ratio gradation. As a result, the created color component has a higher spectral reflectance than the first coloring agent. Further, the first coloring agent and the second coloring agent may be mixed in an arbitrary compounding ratio, thus expressing a large number of colors.

In addition to the foregoing arrangement, the image forming device according to the present invention is provided with the foregoing recording agent.

Note that, in an image forming device using a recording agent created by previously mixing the first coloring agent and the second coloring agent in the same hue in a specific compounding ratio, the colors to be expressed are automatically determined. On the other hand, the image forming device of the present invention applies the first coloring agent and the second coloring agent from the head sections and then mix the two coloring agents on a recording medium. With this structure, the two coloring agents can be mixed in an arbitrary compounding ratio, thus achieving a wider color reproduction.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A recording agent of a color component used for color reproduction through subtractive color mixing, the recording agent comprising:
   mainly a first non-fluorescent coloring agent expressing the color component; and
   a second fluorescent coloring agent identical in hue to the first coloring agent, wherein the recording agent having a higher spectral reflectance than a spectral reflectance of the first coloring agent and, wherein the recording agent contains the second coloring agent in a compounding ratio of x, which is given by:

$Rm=(1-xy) Ro+xyRf$ (y being a predetermined constant and a positive real number satisfying $2<y<3$), where Ro expresses the spectral reflectance of the first coloring agent, Rf expresses a spectral reflectance of the second coloring agent, and Rm expresses the spectral reflectance of the recording agent created by mixing the first coloring agent and the second coloring agent.

2. A recording agent of a color component used for color reproduction through subtractive color mixing, the recording agent comprising:

mainly a first coloring agent expressing the color component; and a second coloring agent identical in hue to the first coloring agent, wherein the recording agent having a higher spectral reflectance than a spectral reflectance of the first coloring agent, wherein the recording agent contains the second coloring agent in a compounding ratio of x, which is given by:

$Rm=(1-xy) Ro+xyRf$ (y being a predetermined constant and a positive real number), where Ro expresses the spectral reflectance of the first coloring agent, Rf expresses a spectral reflectance of the second coloring agent, Rm expresses the spectral reflectance of the recording agent created by mixing the first coloring agent and the second coloring agent.

3. A recording agent of a color component used for color reproduction through subtractive color mixing, the recording agent comprising:

mainly a first coloring agent expressing the color component; and a second coloring agent identical in hue to the first coloring agent, wherein the recording agent having a higher spectral reflectance than a spectral reflectance of the first coloring agent, wherein the recording agent contains the second coloring agent in a compounding ratio of x, which is given by:

$Rm=(1-xy) Ro+xyRf$ (y being a predetermined constant and a positive real number), where Ro expresses the spectral reflectance of the first coloring agent, Rf expresses a spectral reflectance of the second coloring agent, and Rm expresses the spectral reflectance of the recording agent created by mixing the first coloring agent and the second coloring agent, wherein the y is a predetermined constant and a positive real number satisfying $2<y<3$.

4. A recording agent of a color component used for color reproduction through subtractive color mixing, the recording agent comprising:

mainly a first non-fluorescent coloring agent expressing the color component and having a characteristic spectral reflectance; and a second fluorescent coloring agent identical in hue to the first coloring agent imparting to the recording agent a higher spectral reflectance than the spectral reflectance of the first coloring agent, wherein wherein the recording agent contains the second coloring agent in a compounding ratio of x, which is given by:

$Rm=(1-xy) Ro+xyRf$ (y being a predetermined constant), where Ro expresses the spectral reflectance of the first coloring agent, Rf expresses a spectral reflectance of the second coloring agent, and Rm expresses the spectral reflectance of the recording agent created by mixing the first coloring agent and the second coloring agent.

5. The recording agent as set forth in claim 2, wherein:

the first coloring agent is a non-fluorescent coloring agent and the second coloring agent is a fluorescent coloring agent.

6. The recording agent as set forth in claim 4 wherein y is selected such that $2<y<3$.

* * * * *